United States Patent
Oh et al.

(10) Patent No.: US 12,154,379 B2
(45) Date of Patent: Nov. 26, 2024

(54) CAPTURING DIGITAL IMAGES UTILIZING A MACHINE LEARNING MODEL TRAINED TO DETERMINE SUBTLE POSE DIFFERENTIATIONS

(71) Applicant: Adobe Inc., San Jose, CA (US)

(72) Inventors: Jinoh Oh, San Jose, CA (US); Xin Lu, Mountain View, CA (US); Gahye Park, Seoul (KR); Jen-Chan Jeff Chien, Saratoga, CA (US); Yumin Jia, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/306,439

(22) Filed: Apr. 25, 2023

(65) Prior Publication Data
US 2023/0260324 A1    Aug. 17, 2023

Related U.S. Application Data

(62) Division of application No. 17/075,207, filed on Oct. 20, 2020, now Pat. No. 11,670,114.

(51) Int. Cl.
*G06V 40/16* (2022.01)
*G06F 18/22* (2023.01)
*G06K 9/62* (2022.01)
*G06T 7/00* (2017.01)
*G06V 40/20* (2022.01)

(52) U.S. Cl.
CPC .......... *G06V 40/174* (2022.01); *G06F 18/22* (2023.01); *G06T 7/97* (2017.01); *G06V 40/23* (2022.01); *G06T 2207/20084* (2013.01)

(58) Field of Classification Search
CPC ........ G06V 40/174; G06V 40/23; G06T 7/97; G06T 2207/20084; G06K 9/6215
See application file for complete search history.

(56) References Cited

U.S. PATENT DOCUMENTS

2018/0213145 A1*   7/2018   Guo ................... H04N 5/23293

OTHER PUBLICATIONS

Jammalamadaka, Human pose search using deep networks, IVC 2017 (Year: 2017).*

(Continued)

*Primary Examiner* — Mark Roz
(74) *Attorney, Agent, or Firm* — Keller Preece PLLC

(57) ABSTRACT

The present disclosure describes systems, non-transitory computer-readable media, and methods for utilizing a machine learning model trained to determine subtle pose differentiations to analyze a repository of captured digital images of a particular user to automatically capture digital images portraying the user. For example, the disclosed systems can utilize a convolutional neural network to determine a pose/facial expression similarity metric between a sample digital image from a camera viewfinder stream of a client device and one or more previously captured digital images portraying the user. The disclosed systems can determine that the similarity metric satisfies a similarity threshold, and automatically capture a digital image utilizing a camera device of the client device. Thus, the disclosed systems can automatically and efficiently capture digital images, such as selfies, that accurately match previous digital images portraying a variety of unique facial expressions specific to individual users.

20 Claims, 14 Drawing Sheets

(56) References Cited

OTHER PUBLICATIONS

Photobooth—Google AI Blog: Take Your Best Selfie Automatically, with Photobooth on Pixel3,,Apr. 2019 (Year: 2019).*
Jammalamadaka, Human pose search using deep networks, NC 2017 (Year: 2017).
Instagram—"New to Instagram Stories: Upload Any Photo from Your Camera Roll + New Filters", Nov. 2017 (Year: 2017).
U.S. Appl. No. 17/075,207, Jul. 13, 2022, Office Action.
U.S. Appl. No. 17/075,207, Sep. 15, 2022, Office Action.
U.S. Appl. No. 17/075,207, Jan. 12, 2023, Notice of Allowance.

* cited by examiner

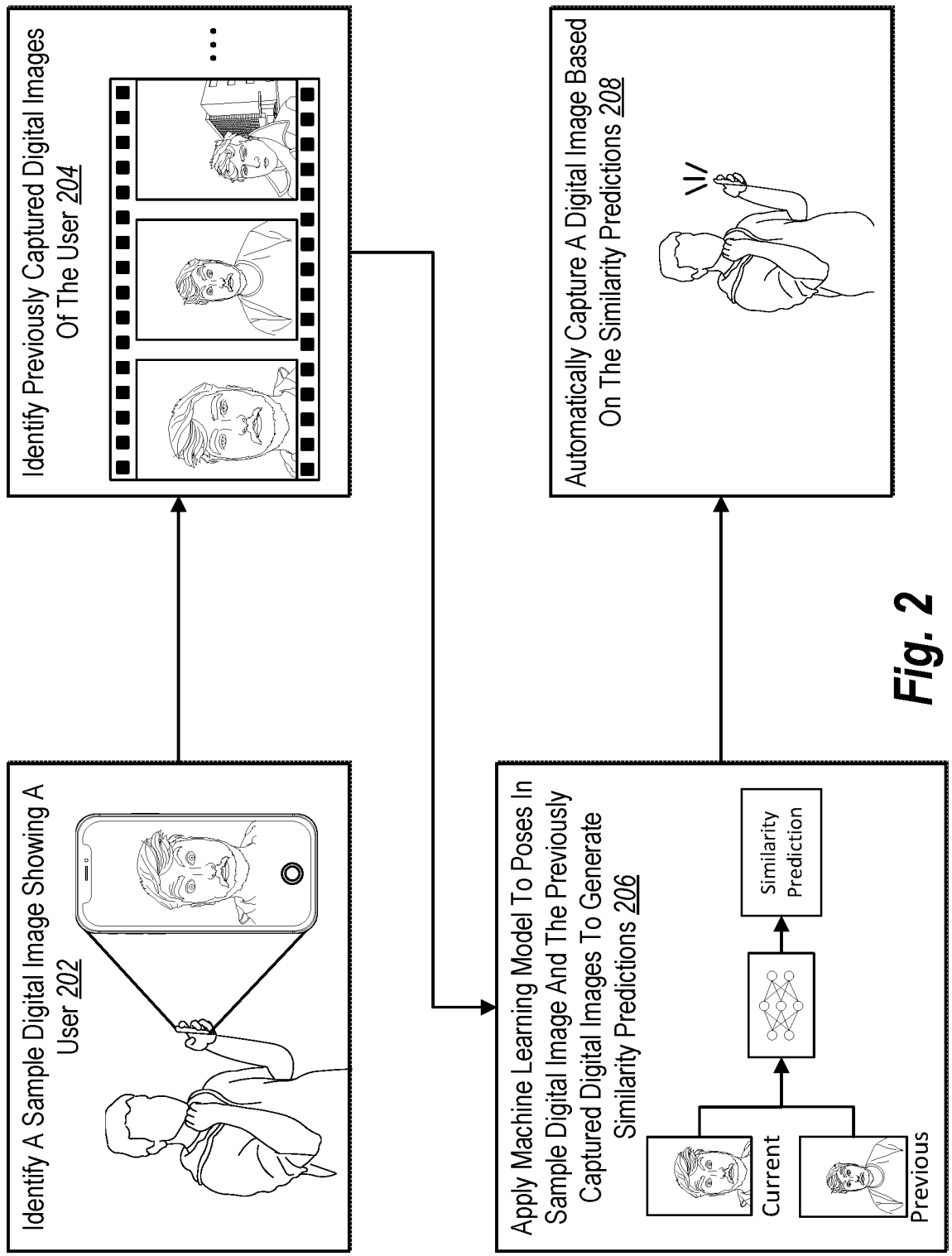

1000

Identifying A Sample Digital Image Portraying A Pose Of A User *1010*

Processing The Sample Digital Image And One Or More Previously Captured Digital Images Portraying One Or More Poses Of The User Utilizing A Machine Learning Model To Generate One Or More Similarity Predictions *1020*

Causing A Camera Of The Client Device To Capture A Digital Image From The Camera Viewfinder Stream Based On The Similarity Predictions *1030*

Identifying A First Sample Digital Image Portraying A Facial Expression Of The User *1110*

Processing The First Sample Digital Image And The One Or More Previously Captured Digital Images Utilizing The Convolutional Neural Network To Generate Similarity Predictions By: *1120*

Generating An Image Pair *1130*

Processing The Image Pair Utilizing Parameters Of The Convolutional Neural Network To Generate A Similarity Prediction *1140*

Capturing A Digital Image Based On The Similarity Prediction *1150*

CAPTURING DIGITAL IMAGES UTILIZING A MACHINE LEARNING MODEL TRAINED TO DETERMINE SUBTLE POSE DIFFERENTIATIONS

CROSS-REFERENCE TO RELATED APPLICATIONS

The present application is a divisional of U.S. application Ser. No. 17/075,207, filed on Oct. 20, 2020. The aforementioned application is hereby incorporated by reference in its entirety.

BACKGROUND

Recent years have seen significant improvements in software and hardware platforms for capturing digital images. For example, conventional image capturing systems now utilize event triggering algorithms to capture "selfie" images using the front-facing camera of a mobile phone. To illustrate, conventional systems can automatically capture a selfie image of a user in response to detecting a specific utterance (e.g., "Cheese!") or in response to detecting an exaggerated facial gesture (e.g., a wide smile).

Despite these advances, conventional systems have a number of problems with regard to flexibility, efficiency, and accuracy of operation. For instance, with regard to flexibility, conventional image capturing systems generally rely on static annotation-based computational models in determining whether to automatically capture a digital image. Specifically, conventional systems utilize static models to automatically capture a digital selfie image upon detecting an audible event (e.g., when the in-frame user says a predetermined word) or identifying a rigid, exaggerated facial gesture. As such, the rigidity of the annotation-based computation model relied upon by conventional systems fails to capture more subtle or personalized facial expressions across different users or contexts.

Moreover, conventional systems also suffer from a number of computer-based inefficiencies. For example, conventional systems often waste significant resources in capturing, storing, and processing unnecessary or unusable digital images. To illustrate, conventional systems often capture digital images that portray users with a set of (often exaggerated) facial expression, even where the user does not desire digital images with that specific facial expression. Accordingly, conventional systems often capture unnecessary digital images that consume unnecessary storage and processing resources. In addition, conventional systems often require duplicative, unnecessary user interactions which multiply the computing resources utilized in capturing digital images. For example, after failing to automatically capture a satisfactory selfie image utilizing a conventional image capturing system, users often resort to inefficient user interactions with a camera device to manually capture a selfie digital image (e.g., interacting with timer options or attempting to fumble with a screen capture selectable option via a user interface while posing for a selfie). These user interactions waste additional time and resources in capturing digital images.

Additionally, as mentioned above conventional systems are often frustratingly inaccurate. For example, the annotation-based computational model relied upon by conventional image capturing systems is often user-agnostic, which leads to inaccurate analysis with regard to a particular user. To illustrate, conventional systems often determines whether an identified smile in a digital frame matches a pre-labeled smile with enough confidence to capture a selfie image of the in-frame user. However, this user-agnostic approach often leads to under-capturing digital images (e.g., failing to recognize the actual smile of a particular user) or over-capturing digital images (e.g., failing to recognize when a particular user is smiling or merely grinning). Thus, conventional systems are generally inaccurate in capturing digital images of specific users.

These along with additional problems and issues exist with regard to conventional image capturing systems.

BRIEF SUMMARY

Embodiments of the present disclosure provide benefits and/or solve one or more of the foregoing or other problems in the art with systems, non-transitory computer-readable media, and methods for utilizing a machine learning model trained to determine subtle pose differentiations to analyze a repository of captured digital images of a particular user to automatically capture digital images portraying the user. In particular, the disclosed systems can utilize a trained machine learning model to compare images from a camera stream with a repository of previously captured images to intelligently capture a current digital image that matches previous contextual poses of the user.

For example, in some embodiments, the disclosed systems identify a camera viewfinder stream portraying a facial expression of a user of a client device and also identify previously captured digital images portraying facial expressions of the user (e.g., from a camera roll on a client device). The disclosed systems utilize a machine learning model to process a sample image from the received camera viewfinder stream in connection with the previously captured digital images to generate one or more similarity predictions between the user's facial expression in the sample image and facial expressions of the user portrayed in the previously captured digital images. If one or more similarity predictions satisfy a certain threshold, in some embodiments, the disclosed systems cause a camera of the client device to automatically capture a selfie digital image of the user. In this manner, the disclosed systems can automatically and efficiently capture digital images that portray poses that accurately match previous contextual facial expressions of a particular user.

Moreover, in one or more embodiments, the disclosed systems can further improve conventional systems by efficiently and accurately learning parameters of the machine learning model. In particular, the disclosed systems can utilize a pair-wise learning set generated based on a digital image repository and/or video clips to learn parameters of a pose matching machine learning model. For example, the disclosed systems generate a pair-wise learning set including positive image pairs, negative image pairs, and corresponding ground truths by intelligently dividing a digital video into facial expression stages and sampling from the determined stages. In order to learn the parameters of the machine learning model, in some embodiments the disclosed systems generate similarity predictions utilizing the machine learning model, compare the similarity predictions to ground truths corresponding to the positive and negative image pairs, and modify the parameters of the machine learning model based on the comparisons.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

FIG. 2 illustrates the automatic image capturing system automatically capturing a digital image based on a threshold level of similarity between poses in accordance with one or more embodiments.

FIG. 10 illustrates a flowchart of a series of acts for automatically capturing a digital image of a pose of a user in accordance with one or more embodiments.

FIG. 11 illustrates a flowchart in a series of acts for automatically capturing a selfie digital image of a facial expression of a user in accordance with one or more embodiments.

DETAILED DESCRIPTION

Figure 1:
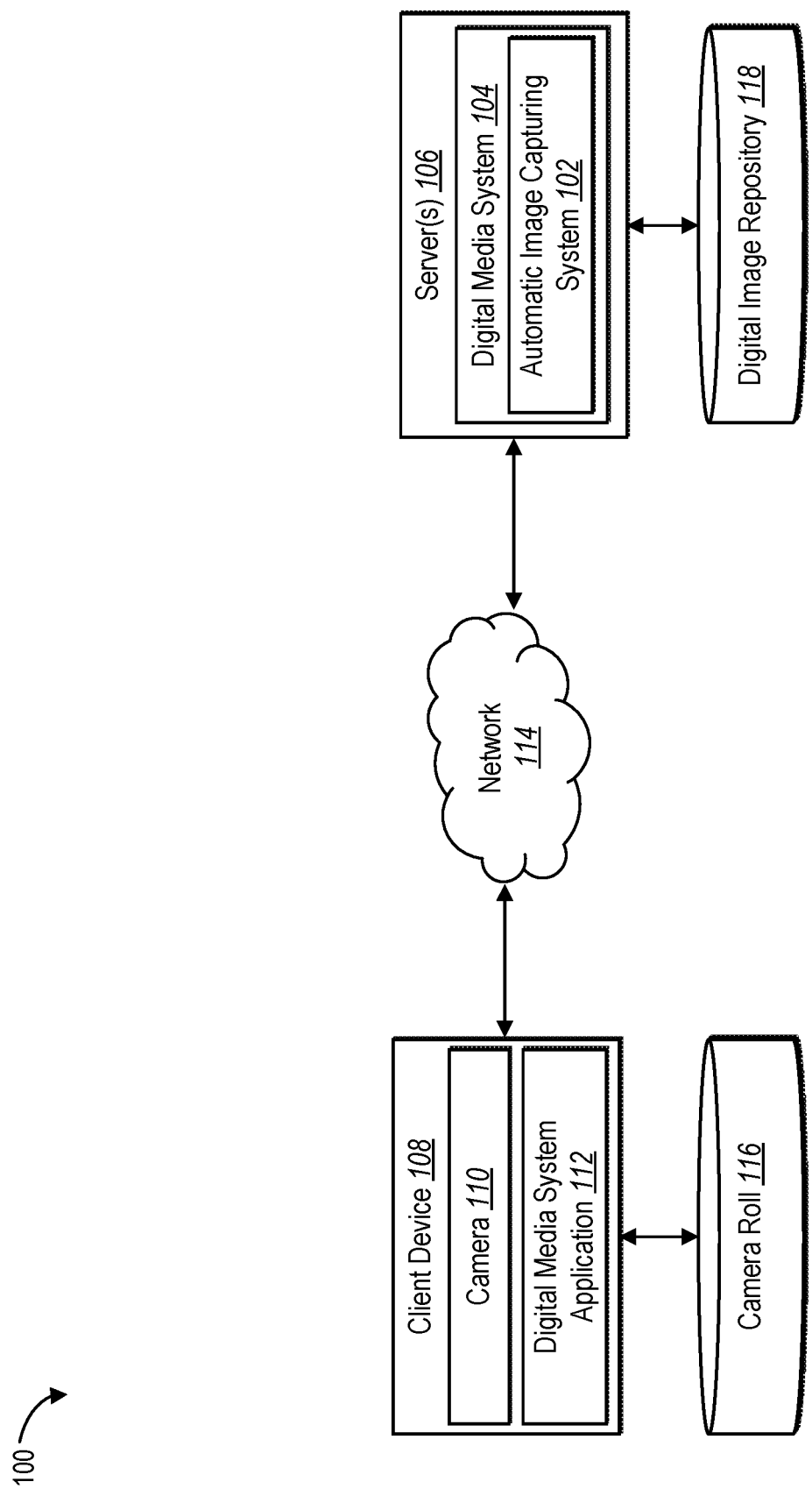
FIG. 1 illustrates a schematic diagram of an environment in which an automatic image capturing system can operate in accordance with one or more embodiments.

This disclosure describes one or more embodiments of an automatic image capturing system that utilizes a trained pose differentiation machine learning model to analyze a repository of digital images portraying poses of a user and automatically captures a digital image portraying a similar pose from a viewfinder stream. For example, in one or more embodiments, the automatic image capturing system utilizes a trained machine learning model to generate a similarity prediction between the pose of the user in a sample image and a pose of the user in a previously captured digital image. In response to determining that the similarity prediction satisfies a similarity threshold, the automatic image capturing system causes a camera device to capture the digital image from the camera viewfinder stream without any input from the user. In this manner, the automatic image capturing system can flexibly, efficiently, and accurately capture digital images that portray contextual poses of a user, including a personalized-auto selfie digital image.

Furthermore, in one or more embodiments the automatic image capturing system efficiently and accurately learns parameters of the machine learning model. In particular, the automatic image capturing system generates pair-wise learning sets based previously captured digital images and/or digital videos. For example, the automatic image capturing system generates pair-wise learning sets that include positive image pairs, negative image pairs, and image pair ground truths. To illustrate, the automatic image capturing system divides a digital video into facial expression clip stages and samples from the clip stages to generate positive image pairs (reflecting similar facial expressions) and negative image pairs (reflecting nuanced pose differences). The automatic image capturing system, in one or more embodiments, learns the parameters of the machine learning model by generating similarity predictions utilizing the machine learning model based on the positive image pairs and the negative image pairs.

As mentioned above, in some embodiments, the automatic image capturing system captures a digital image with a particular pose by analyzing a stream of digital images. For example, the automatic image capturing system can identify and/or receive a camera viewfinder stream from a client device of a user. To illustrate, when a user opens a camera capturing application on a smartphone, the automatic image capturing system can begin analyzing sample digital images from the stream received by the camera capturing application in real time to determine when to utilize the camera to capture a digital image portraying a particular pose/facial expression.

As discussed, in one or more embodiments the automatic image capturing system also identifies previously captured digital images portraying one or more poses of the user. For example, the automatic image capturing system accesses a camera roll portraying digital images captured via a smartphone devices and analyzes previously captured digital images. The automatic image capturing system can analyze these digital images to identify a particular subset or class of images (e.g., selfie images that portray the same user portrayed in the camera viewfinder stream). Accordingly, in some embodiments the automatic image capturing system identifies one or more previously captured digital images that are specific to the user and portray the user in particular contextual poses (e.g., facial expressions and/or body positions).

In one or more embodiments, the automatic image capturing system generates similarity predictions by comparing a sample digital image (from the viewfinder stream) and previously captured digital images of the user. For example, the automatic image capturing system creates image pairs of the sample digital image and each of the previously captured digital images. In at least one embodiment, the automatic image capturing system utilizes a trained machine learning model to process the image pairs to generate the similarity predictions. For instance, the machine learning model generates a similarity prediction for an image pair that indicates a similarity level between the pose of the user portrayed in the sample digital image and the pose of the user portrayed in the previously captured digital image in the image pair.

In one or more embodiments, the automatic image analyzes the similarity predictions to determine whether to capture a digital image utilizing the camera device. For example, the automatic image analyzes similarity predictions between the image pairs relative to a similarity threshold. In response to determining that at least one of the similarity predictions satisfies the similarity threshold, the automatic image capturing system causes a camera of the user's client device to capture a digital image from the camera viewfinder stream (without any input from the user). Accordingly, the automatic image capturing system can capture a digital image that portrays a particular pose (portrayed in previous digital images captured by the user) without requiring the user to provide auditory signals or utilize an inflexible, pre-defined facial expression.

As mentioned above, the automatic image capturing system can also train a machine learning model to learn subtle differences in poses and generate accurate pose similarity predictions. In particular, in one or more embodiments, the automatic image capturing system generates one or more pair-wise learning sets to train the machine learning model to generate similarity predictions. For example, the automatic image capturing system generates the one or more pair-wise learning sets based on digital images from a digital image repository and/or video clip frames from one or more video clips.

To illustrate, the automatic image capturing system generates a pair-wise learning set based on a digital image repository by identifying pairs of digital images, where each digital image in the pair portrays the same person in a pose (e.g., with a facial expression or body position). For example, the automatic image capturing system further analyzes the digital images in each image pair to determine a ground truth label for the image pair (e.g., a positive label or negative label). In one or more embodiments, the automatic image capturing system determines the ground truth for an image pair that indicates a level of similarity between the pose of the user in the first digital image in the image pair and the pose of the user in the second digital image in the image pair.

In additional or alternative embodiments, the automatic image capturing system generates a pair-wise learning set based on video clips. For example, the automatic image capturing system utilizes one or more decomposition algorithms to determine a number of video clip stages associated with a video clip, where each video clip stage includes one or more video clip frames. The automatic image capturing system samples positive and negative image pairs from the video clip stages, where the ground truth of each image pair depends on whether the image pair is positive or negative.

The automatic image capturing system utilizes the generated one or more pair-wise learning sets to train the machine learning model to generate similarity predictions. For example, the automatic image capturing system utilizes the machine learning model to process the positive and negative images pairs in the pair-wise learning set and generate similarity predictions. The automatic image capturing system further compares the generated similarity predictions to corresponding ground truths. In at least one embodiment, the automatic image capturing system modifies parameters of the machine learning system based on the comparisons until one or more loss functions are minimized.

As mentioned above, the automatic image capturing system provides many advantages and benefits over conventional systems and methods. For example, the automatic image capturing system improves the flexibility of conventional image capturing systems by automatically capturing digital images in response to detecting a wide array of poses. Indeed, by utilizing a dynamic machine learning model trained to determine similarity levels between poses of the same person, the automatic image capturing system can flexibly capture digital images based on the context of previous digital images preferred by a particular user. Thus, for instance, the automatic image capturing system can automatically capture a digital image with a serious pose for a first user (based on the first user having a preference for a serious pose in previous digital images) while automatically capturing a digital image with a whimsical expression for a second user (based on the second user having a preference for whimsical expressions in previous digital images).

Moreover, the automatic image capturing system can also improve efficiency relative to conventional systems. For example, the automatic image capturing system reduces computing resources used to capture, process, and store unnecessary digital images. More specifically, the automatic image capturing system automatically captures selfie digital images and other of digital images that portray similar poses with previously captured digital images (and are therefore more likely to be used). Thus, the automatic digital image capturing system saves the computing resources that would have otherwise been wasted by conventional image capturing systems in capturing and storing unusable digital images. In addition, the automatic image capturing system can significantly reduce user interactions and corresponding computer resources. For example, the automatic image capturing system can avoid unnecessary time and user interactions with timer options and capture buttons in automatically capturing digital images that portray desirable poses (as intelligently gleaned from historical digital images of the user).

Additionally, the automatic image capturing system improves accuracy relative to conventional systems. In particular, the automatic image capturing system provides an automatic image capturing solution that is accurate in detecting subtle differences in expressions of individual users. As discussed in greater detail below, the automatic image capturing system can train the machine learning model to determine facial expression similarities by analyzing both positive and negative pair-wise images. Moreover, in some embodiments the automatic image capturing system generates training image pairs with subtle expression differences by isolating and sampling digital images from digital videos illustrating feature transformations. The automatic image capturing system can utilize a machine learning model trained to capture the relative distance between facial expressions to accurately determine subtle similarities and differences in facial expressions of particular users. Moreover, the automatic image capturing system can apply the machine learning model to a repository of digital images that portray a particular user. Accordingly, instead of the user-agnostic approach of conventional image capturing systems, the automatic image capturing system can utilize a dynamic machine learning model that identifies subtle pose/expression similarities and differences of specific individuals. Thus, for example, the automatic image capturing system is able to accurately capture selfie images of a user who has a history of taking selfies with unique facial expressions.

Additional detail regarding the anomaly detection system will now be provided with reference to the figures. For example, FIG. 1 illustrates a schematic diagram of an example system environment 100 (e.g., the "environment" 100) for implementing an automatic image capturing system 102 in accordance with one or more embodiments. Thereafter, a more detailed description of the components and processes of the automatic image capturing system 102 is provided in relation to the subsequent figures.

As shown in FIG. 1, the environment 100 includes server(s) 106 and a client device 108, and a network 114. Each of the components of the environment 100 can communicate via the network 114, and the network 114 may be any suitable network over which computing devices can communicate. Example networks are discussed in more detail below in relation to FIG. 12.

As mentioned, the environment 100 includes the client device 108. The client devices 108 can be one of a variety of computing devices, including a smartphone, tablet, smart television, desktop computer, laptop computer, virtual reality device, augmented reality device, or other computing device as described in relation to FIG. 12. In some embodiments, the environment 100 can include a different number or arrangement of client devices, each associated with a different user.

As further shown, the client device 108 includes a camera 110. In one or more embodiments, the camera 110 includes a front-facing camera and/or a rear-facing camera. The camera 110 includes the ability for remote activation such that the automatic image capturing system 102 can cause the camera 110 to capture a digital image. When activated, the camera 110 also generates a camera viewfinder stream including multiple viewfinder stream frames. For example, a camera viewfinder stream includes a set of image frames from a camera of a client device over time. For instance, a camera viewfinder stream can include sequential images identified from a camera at a particular frame rate. The sequential image frames may be spaced at a rate of, for example, eight image frames per second. In at least one embodiment, the camera 110 stores captured digital images to a camera roll 116.

The client device 108 also includes a digital media system application 112. In one or more embodiments, the digital media system application 112 provides information (e.g., a camera viewfinder stream) to a digital media system 104 on the server(s) 106. In at least one embodiment, the digital media system application 112 can further cause the camera 110 to capture a digital image in response to receiving a trigger or instructions from the automatic image capturing system 102.

As further illustrated in FIG. 1, the environment 100 includes the server(s) 106. The server(s) 106 may include one or more individual servers that may generate, store, receive, and transmit electronic data. For example, the server(s) 106 may receive data from the client device 108 in the form of a camera viewfinder stream and/or one or more captured digital images. In addition, the server(s) 106 can transmit data to the client device 108.

As further shown in FIG. 1, the server(s) 106 can also include the automatic image capturing system 102 as part of the digital media system 104. The digital media system 104 can receive, generate, modify, analyze, store, and transmit digital media content. For example, the digital media system 104 can communicate with the client device 108 to receive captured digital images. In at least one embodiment, the digital media system 104 can store the received captured digital images in a digital image repository 118.

Although FIG. 1 depicts the automatic image capturing system 102 located on the server(s) 106, in some embodiments, the automatic image capturing system 102 may be implemented by (e.g., located entirely or in part) on one or more other components of the environment 100. For example, the automatic image capturing system 102 may be implemented in whole or in part by the client device 108.

FIG. 2 illustrates an overview of the automatic image capturing system 102 capturing a digital image. In particular, the automatic image capturing system 102 causes a camera device to automatically capture a digital image based on a threshold level of similarity between poses of a user in a sample image from a current camera viewfinder stream and at least one previously captured digital image portraying the user. For example, the automatic image capturing system 102 can identify both the sample digital image portraying the pose of the user and the previously captured digital images portraying poses of the user. The automatic image capturing system 102 can then apply a trained machine learning model to image pairs of the sample image and the previously captured digital images to generate similarity predictions. Based on at last one similarity prediction satisfying a similarity threshold, the automatic image capturing system 102 can automatically capture a digital image from the current camera viewfinder stream (without any user interaction with a user interface or audio signaling from the user).

For example, as shown in FIG. 2 the automatic image capturing system 102 performs an act 202 of identifying a sample digital image showing a user. For example, a sample digital image includes a digital visual representation. In particular a sample digital image can include an image frame extracted from a camera viewfinder stream. In one or more embodiments, the automatic image capturing system 102 can extract the sample digital image from the camera viewfinder stream based on a standard timing or number of frames (e.g., extracted every second, extracted every 15 frames). Additionally or alternatively, the automatic image capturing system 102 can further extract the sample digital image based on further determining that an image frame from the camera viewfinder stream includes a face, or a human body.

To illustrate, the automatic image capturing system 102 can receive a camera viewfinder stream from a client device (e.g., the client device 108 illustrated in FIG. 1) of the user. In one or more embodiments, the automatic image capturing system 102 identifies a sample digital image from the camera viewfinder stream by identifying a frame from the viewfinder stream that portrays the user of the client device. For example, in one or more embodiments, the automatic image capturing system 102 identifies sample digital images from the camera viewfinder stream at predetermined times (e.g., 3 seconds after receiving the camera viewfinder stream), and/or at regular intervals (e.g., every second, every 15 frames).

In another embodiment, and in order to more efficiently activate the additional detection and image capturing processes described herein, the automatic image capturing system 102 can determine one or more triggering events or conditions. For example, the automatic image capturing system can detect user selection of an automatic capturing element in a user interface. In response the automatic image capturing system can begin analyzing sample digital images from the camera viewfinder stream.

In other embodiments, the automatic image capturing system utilizes one or more image analysis models prior to processing sample digital images to determine a similarity prediction. For instance, the camera viewfinder stream may, at any point, portray objects other than the user and/or the user in a pose. To illustrate, the camera viewfinder stream may portray the floor, a wall, the ceiling, random objects, the user's leg or arm, or any other object that is not the user's face or the user's face in combination with other portions of the user's body (e.g., as with the user in a pose). This may be because the user is moving the client device 108 into an image capturing position after activating the camera 110 of the client device 108. In one or more embodiments, the automatic image capturing system 102 delays one or more image capturing processes until determining that the user is ready for automatic image capturing. In at least one embodiment, the automatic image capturing system 102 makes this determination by applying one or more models to frames from the camera viewfinder stream to identify the identify the sample digital image (e.g., to determine that a digital image portrays a user, a face of a user, and/or a particular body portion of a user).

For example, the automatic image capturing system 102 can apply a facial detection model to frames of the camera viewfinder stream at regular intervals (e.g., every 10 frames) until the facial detection model indicates that a particular frame includes a face (e.g., a face of a particular individual). The automatic image capturing system 102 can then identify that frame as the sample digital image. Additionally or alternatively, the automatic image capturing system 102 can apply a body detection model to frames of the camera viewfinder stream at regular intervals until the body detection model indicates that a particular frame includes more than a predetermined percentage of a human body. The automatic image capturing system 102 can then identify that frame as the sample digital image.

As further shown in FIG. 2, the automatic image capturing system 102 performs an act 204 of identifying previously captured digital images of the user. For example, a previously captured digital image can include a digital image stored in a repository (e.g., a digital image repository, a camera roll). To illustrate, the automatic image capturing system 102 can access a repository of digital images (e.g., the digital image repository 118 illustrated in FIG. 1) to identify digital images portraying users in various poses. In one or more embodiments, the automatic image capturing system 102 utilizes one or more image analysis models to identify a subgroup of digital images that portray the user portrayed in the identified sample digital image. For instance, the automatic image capturing system 102 can identify selfie images of the user where the user is portrayed with various facial expressions. Additionally, the automatic image capturing system 102 can identify digital images of the user where the user is alone and/or one of several portrayed people, and/or where the user is portrayed with various facial expressions and/or body positions.

As further shown in FIG. 2, the automatic image capturing system 102 performs an act 206 of applying a machine learning model to poses of the user in the sample digital image and the previously captured digital images to generate similarity predictions. For example, a similarity prediction can include a determination with regard to similarity of two digital images (e.g., a prediction output of a machine learning model). In one or more embodiments, the automatic image capturing system trains a machine learning model to detect nuanced similarities among portrayals of a user in digital images. For instance, the automatic image capturing system can train the machine learning model to generate similarity predictions including one or more of facial expression similarity predictions, and pose similarity predictions. For example, a facial expression similarity prediction indicates whether two or more input digital images portray a user with similar facial expressions in the input images. Additionally, a pose similarity prediction indicates whether two or more input digital images portray a user with similar poses in the input images.

For example, the automatic image capturing system 102 generates image pairs of the sample digital image and each of the previously captured digital images portraying the user. The automatic image capturing system 102 can process each image pair utilizing a trained machine learning model to generate similarity predictions. In one or more embodiments, the trained machine learning model generates a similarity prediction for an image pair that indicates a similarity level between a pose of the user in the sample digital image and a pose of the user in a previously captured digital image.

A pose can include a position, configuration, or expression of a body or face. In particular, in one or more embodiments, a pose refers to a facial expression of a human. To illustrate a pose can include a subtle and/or nuanced human facial expression. Additionally in some embodiments, a pose refers to a body configuration of human (e.g., a particular configuration of joints and limbs). To illustrate, a body position can include a hand gesture (e.g., a peace sign), an arm gesture (e.g., two arms in the air in a victory pose), a full-body gesture (e.g., jumping in the air with both feet off the ground). Thus, the automatic image capturing system 102 can capture a sample digital image utilizing a camera device where the facial expression and/or body configuration portrayed in the sample digital image matches a facial expression and/or body configuration portrayed in a previously captured digital image.

As further shown in FIG. 2, the automatic image capturing system 102 performs an act 208 of automatically capturing a digital image based on the similarity predictions. For example, the automatic image capturing system 102 compares the generated similarity predictions to a similarity threshold. For example, a similarity threshold can include a value against which the automatic image capturing system compares a similarity prediction. In one or more embodiments, the similarity prediction may be a non-binary value such as a score. In that embodiment, the similarity threshold may be a threshold comparison score. For example, the automatic image capturing system can determine that a similarity prediction satisfies the threshold comparison score if the similarity prediction is greater than or equal to the threshold comparison score. In another embodiment, the similarity prediction may be a binary value such as "1" or "0." In that embodiment, the similarity threshold may be a comparison value such as "1." For example, the automatic image capturing system can determine that a similarity prediction satisfies the comparison value if the similarity prediction equals or is the same as "1."

In at least one embodiment, if at least one similarity prediction meets and/or satisfies the similarity threshold, the automatic image capturing system 102 can cause the camera of the client device associated with the user to capture a digital image from the camera viewfinder stream (without any user selection via a user interface or audio input received via the client device). In some embodiments, the client device can save the captured digital image in local storage (e.g., the camera roll 116 shown in FIG. 1), and can provide the captured digital image to the automatic image capturing system 102 for use in further training of the machine learning model.

Although the example of FIG. 2 illustrates a particular type of digital images (e.g., a "selfie" digital images on the client device 108 portraying the user of the client device 108), the automatic image capturing system 102 can automatically capture digital images of any individual/user via the client device. For example, the automatic image capturing system 102 can automatically capture digital images of any user for whom previously captured digital images exist. In at least one embodiment, the automatic image capturing system 102 can enable the user of the client device to select a specific person that the automatic image capturing system 102 should search for in automatically capturing a digital image. Indeed, upon selecting a specific person, the automatic image capturing system 102 can analyze digital images portraying that specific person represented in the digital image repository 118. In other embodiments, the automatic image capturing system 102 automatically searches for previous digital images portraying any person shown in a camera stream. Thus, in at least one embodiment, the automatic image capturing system 102 can automatically capture, via the client device, selfie digital images of the user of the client device, digital images of other people of whom the user of the client device 108 often takes pictures, and/or celebrities who are often photographed.

Figure 3A:
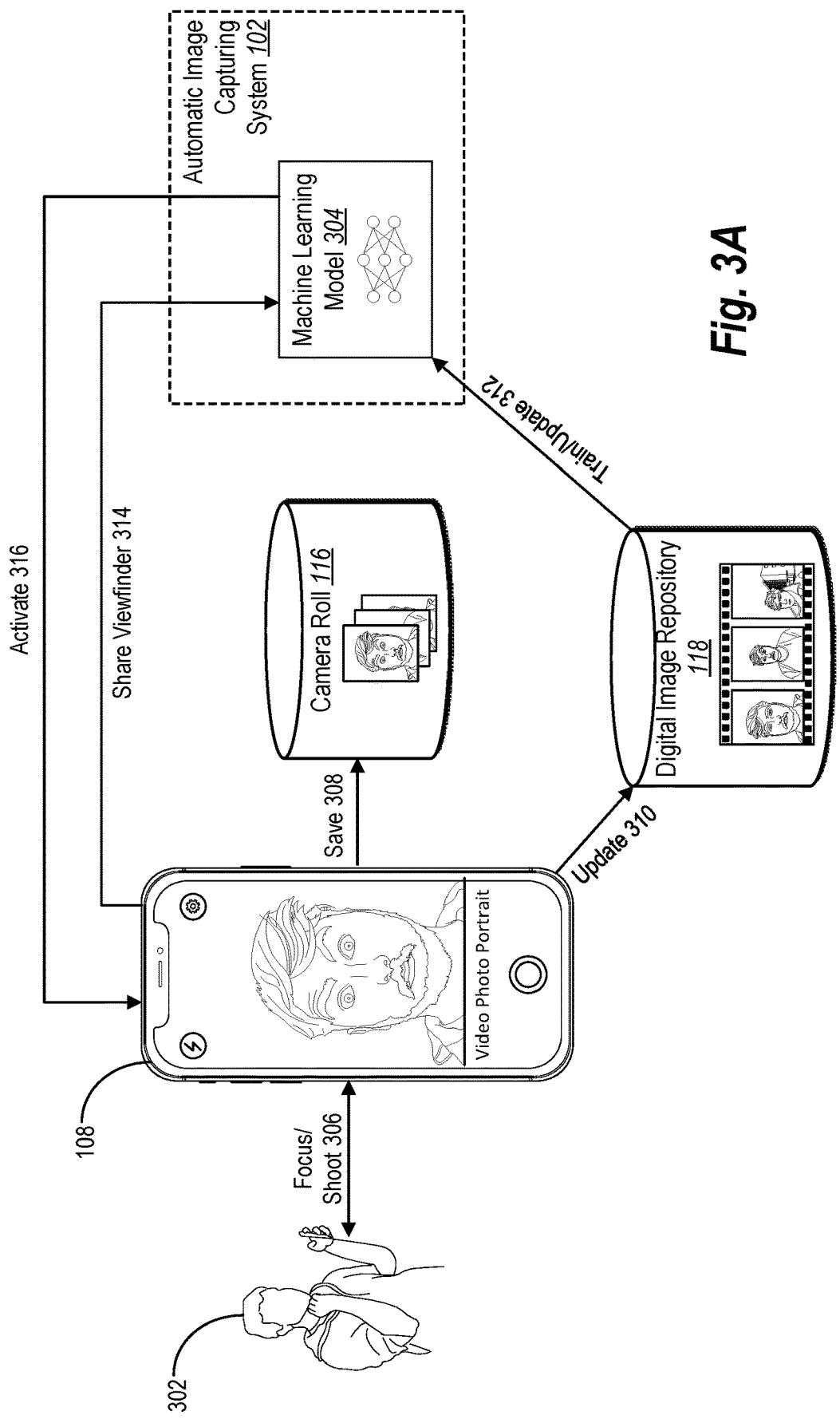
FIG. 3A illustrates the automatic image capturing system automatically causing a client device to capture a digital image in accordance with one or more embodiments.

FIG. 3A illustrates an additional overview of the automatic image capturing system 102 automatically causing the client device 108 to capture a digital image in accordance with one or more embodiments. For example, as will be discussed in greater detail below, the client device 108 can provide manually captured selfie images to update the digital image repository 118. Once a training threshold associated with a machine learning model 304 is met (e.g., a threshold number of digital images in the digital image repository 118, a threshold amount of time is met), the automatic image capturing system 102 utilizes the digital image repository 118 and other digital images to learn parameters of the machine learning model 304 and/or otherwise train the machine learning model 304. After the machine learning model 304 is trained, the automatic image capturing system 102 utilizes the machine learning model 304 to determine whether to automatically capture additional selfie images from a camera viewfinder stream of a camera (e.g., the camera 110) of the client device 108.

In one or more embodiments, the machine learning model 304 is a computer-implemented model that can be tuned (e.g., trained) based on inputs to approximate unknown functions. For example, the machine learning model 304 can include a neural network model of interconnected layers that communicate and analyze attributes at varying degrees of abstraction to learn to approximate complex functions and generate outputs based on a plurality of inputs provided to the machine learning model 304. In one or more embodiments, the machine learning model 304 includes convolutional neural networks (i.e., "CNNs"). In other words, the machine learning model 304 includes an algorithm that implements deep learning techniques, i.e., machine learning that utilizes a set of algorithms to attempt to model high-level abstractions in data. For example, in at least one embodiment, the machine learning model 304 can include a plurality of convolution layers and max-pooling layers followed by fully-connected layers to generate a similarity prediction associated with a pose of a user in a first digital image and a pose of the same user in a second digital image. In additional or alternative embodiments, the machine learning model 304 can include other or additional neural network architectures (alone or in combination) such as: a recurrent neural network, a feedforward neural network, a long-short term memory network, a self organizing neural network, a decision tree, a random forest, a gradient boosting network, and/or a modular neural network. Moreover, the machine learning model 304 can employ any of various types of machine learning algorithms including, but not limited to, linear regressions, logistic regressions, decision trees, naïve Bayes, k-nearest neighbors, and/or k means clustering.

As shown in FIG. 3A a user 302 of the client device 108 manually focuses a camera of the client device 108 to shoot a selfie digital image in an act 306. To illustrate, the user 302 can activate a front-facing camera 110 of the client device 108, utilize the camera viewfinder stream to center the camera 110 on his or her face, and tap a shutter button associated with the camera 110 to capture a selfie digital image.

The client device 108 (e.g., via the camera 110) can save the captured selfie digital image to the camera roll 116 in an act 308. For example, the client device 108 can save the captured selfie digital image to the camera roll 116 along with associated metadata. For instance, the client device 108 can save the captured selfie digital image to the camera roll 116 along with a timestamp indicating when the selfie digital image was captured, a geotag indicating where the selfie digital image was captured, and other information associated with the selfie digital image.

Additionally, the client device 108 (e.g., via the digital media system application 112) can update the digital image repository 118 with the captured selfie digital image in an act 310. For example, the client device 108 can provide the captured selfie digital image to the automatic image capturing system 102 with instructions for the captured selfie digital image to be added to the digital image repository 118. The automatic image capturing system 102 can update the digital image repository 118 with the selfie digital image and the other metadata associated with the selfie digital image.

The automatic image capturing system 102 can utilize the digital image repository 118 and other digital images to train the machine learning model 304 in an act 312. For example, the automatic image capturing system 102 can generate one or more pair-wise learning sets utilizing the digital images in the digital image repository 118. For example, a pair-wise learning set can include image pairs and corresponding ground truths. For example, the image pairs can include positive image pairs and negative image pairs. In one or more embodiments, positive image pairs include pairs of digital images where each digital image in the pair portrays the same person with a similar pose (e.g., similar facial expression, similar body position). Similarly, negative image pairs include pairs of digital images where each digital image in the pair either 1) portrays different people, and/or 2) the same person with different poses (e.g., different facial expressions, different body positions). In one or more embodiments, each image pair in the pair-wise learning set corresponds with a ground truth, where the corresponding ground truth indicates whether the image pair is positive or negative.

The automatic image capturing system 102 can analyze the one or more pair-wise learning sets and generate similarity predictions associated with pairs of digital images from the digital image repository 118. The automatic image capturing system 102 can further train the machine learning model 304 by modifying parameters of the machine learning model 304 based on comparing the generated similarity predictions to ground truths associated with the pair-wise learning sets (e.g., utilizing a loss function). The automatic image capturing system 102 can continue to modify parameters of the machine learning model 304 until converging (or until reaching a threshold number of training iterations/epochs). Additional detail regarding training the machine learning model 304 is provided below (e.g., in relation to FIG. 8).

As shown in FIG. 3A, the automatic image capturing system 102 can utilize the trained machine learning model 304 to determine whether to cause the camera 110 of the client device 108 to capture a digital selfie image. For example, the automatic image capturing system 102 can receive a camera viewfinder stream shared by the client device 108 in an act 314. The automatic image capturing system 102 can analyze the camera viewfinder stream to identify a sample digital image portraying a facial expression of the user 302. The automatic image capturing system 102 can utilize the sample digital image in connection with other previously captured digital images portraying facial expressions of the user 302 (e.g., identified from the digital image repository 118) to generate image pairs (e.g., one image pair would include the sample digital image and a previously captured digital image). The automatic image capturing system 102 can further process the generated image pairs utilizing the trained machine learning model 304 to generate similarity predictions for each image pair.

If at least one of the generated similarity predictions satisfies a similarity threshold, the automatic image capturing system 102 can activate the camera 110 of the client device 108 in an act 316. For example, the automatic image capturing system 102 can determine that at least one of the similarity predictions is positive, or that at least one of the similarity predictions is a value that is equal to or more than the similarity threshold.

In one or more embodiments, the automatic image capturing system 102 can then cause the camera 110 of the client device 108 to capture a selfie digital image from the camera viewfinder stream (without user interaction from the user 302). For example, the automatic image capturing system 102 can cause the camera 110 to convert a camera viewfinder stream frame to a captured digital image without requiring the user 306 to select a shutter button associated with the camera 110 via a user interface of the client device 108.

In response to automatically capturing a selfie digital image, the client device 108 can save the new selfie digital image to the camera roll 116 by repeating the act 308. The client device 108 (e.g., via the digital media system application 112) can further update the digital image repository 118 with the new selfie digital image by repeating the act 310. The automatic image capturing system 102 can periodically re-train and/or update the machine learning model 304 by repeating the act 312. For example, the automatic image capturing system 102 can determine to repeat the act 312 in response to determining that a threshold number of new digital images have been added to the digital image repository 118 or in response to determining that a threshold amount of time has passed since the last time the act 312 was performed.

Figure 3B:
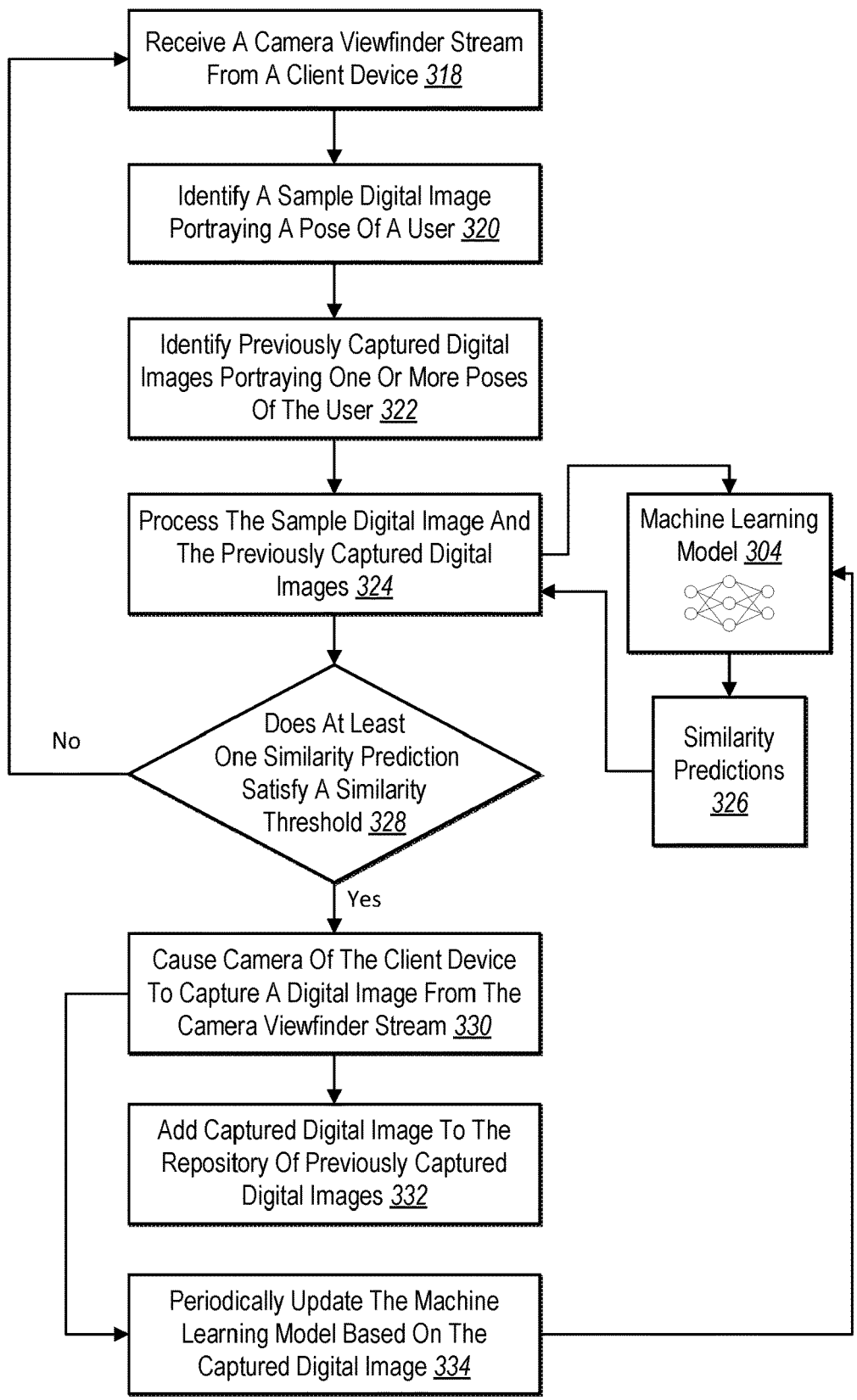
FIG. 3B illustrates a sequence diagram of the automatic image capturing system automatically capturing one or more digital images via a client device, without any further user input in accordance with one or more embodiments.

FIG. 3B illustrates a sequence diagram of the automatic image capturing system 102 automatically capturing one or more digital images via the client device 108 in accordance with one or more embodiments. For example, and as will be discussed in greater detail below, the automatic image capturing system 102 generates image pairs including a sample digital image from the current camera viewfinder stream of the client device 108 in combination with other previously captured digital images associated with the user of the client device 108. The automatic image capturing system 102 then applies a trained machine learning model to the image pairs to generate similarity predictions associated with each image pair. The automatic image capturing system 102 causes a camera of the client device 108 to capture a digital image based on the similarity predictions.

In more detail, the automatic image capturing system 102 receives a camera viewfinder stream from a client device in an act 318. For example, as mentioned above, the automatic image capturing system 102 can receive the camera viewfinder stream from the client device 108 via the digital media system application 112. To illustrate, the digital media system application 112 can continuously route the camera viewfinder stream of image frames from the camera 110 of client device 108 to the automatic image capturing system 102. The automatic image capturing system 102 can receive the camera viewfinder stream as a continuous stream of image frames. Similarly, in some embodiments, the digital media system application 112 can sample images from the camera viewfinder stream of image frames at a particular rate (e.g., sample 2 frames per second).

The automatic image capturing system 102 further identifies a sample digital image portraying a pose (e.g., a facial expression, a body position) of the user from the received camera viewfinder stream in an act 320. For example, the automatic image capturing system 102 can identify the sample digital image by performing various checks against image frames from the camera viewfinder stream until at least one image frame satisfies certain thresholds. The automatic image capturing system 102 can identify that image frame as the sample digital image.

To illustrate, the automatic image capturing system 102 can extract image frames from the camera viewfinder stream at regular intervals (e.g., every tenth image frame). The automatic image capturing system 102 can further apply one or more models (e.g., a facial detection model, a body detection model) to an extracted image frame to determine, with a threshold level of certainty: that the extracted image frame portrays the user of the client device 108, that the extracted image frame portrays a facial expression of the user of the client device 108, that the extracted image frame portrays a body portion of the user of the client device 108, and/or that the extracted image frame portrays the user of the client device 108 as the main subject. For example, the automatic image capturing system 102 can utilize a facial recognition model in combination with other trained models (e.g., a selfie detection model, a body detection model) to make any of these determinations in order to ensure that other processes are not triggered by an extracted image that portrays objects and/or scenes that do not at least include a person. In response to determining with a threshold level of certainty that the extracted image frame portrays the user of the client device 108 in any of these configurations, the automatic image capturing system 102 can identify the extracted image frame as the sample digital image portraying a pose of the user of the client device 108.

The automatic image capturing system 102 also identifies previously captured digital images portraying one or more poses of the user of the client device 108 in an act 322. For example, the automatic image capturing system 102 can identify previously captured digital images from the digital image repository 118. In one or more embodiments, the automatic image capturing system 102 can utilize a facial detection model to identify one or more previously captured digital images in the digital image repository 118 that portray the user of the client device 108. In at least one embodiment, the automatic image capturing system 102 can further utilize one or more additional models (e.g., a selfie detection model, a body detection model) to identify a subset of the one or more previously captured digital images that portray the user, where the subset of previously captured digital images portray the user of the client device 108 as the main object of the digital image, in a selfie (e.g., the user's face takes up more than a threshold percentage of the image), of in a full-body position (e.g., the user is making a body pose that takes up more than a threshold percentage of the image).

With the sample digital image and the previously captured digital images, the automatic image capturing system 102 processes the sample digital image and the previously captured digital images in an act 324. For example, the automatic image capturing system 102 utilizes the sample digital image and the previously captured digital images to generate image pairs for use in connection with the machine learning model 304. The automatic image capturing system 102 then applies the machine learning model 304 to the image pairs to generate similarity predictions 326.

In more detail, the automatic image capturing system 102 generates input image pairs by pairing the sample digital image with each of the identified previously captured digital images. For example, the automatic image capturing system 102 generates a first image pair including the sample digital image and a first previously captured digital image. Thus, the digital images in the first image pair portray the user of the client device 108 in a first pose, and the user of the client device 108 in a second pose. In some embodiments, the first pose of the user and the second pose of the user may be the same pose (e.g., same facial expression), similar poses (e.g., similar facial expressions), or different poses (e.g., different facial expressions). The automatic image capturing system 102 can generate additional image pairs by combining the sample digital image with each of the remaining previously captured digital images portraying poses of the user.

The automatic image capturing system 102 can further process the generated image pairs utilizing the machine learning model 304. In one or more embodiments, the automatic image capturing system 102 trains the machine learning model 304 to generate a similarity prediction indicating whether a pose of a user in a first digital image in an image pair has a threshold level of similarity relative to a pose of the user in a second digital image in the image pair. Thus, the automatic image capturing system 102 can apply the machine learning model 304 to the generated image pairs one-by-one in the act 324 to generate a similarity prediction 326 associated with each image pair.

In additional or alternative embodiments, rather than processing image pairs one-by-one as discussed above, the automatic image capturing system 102 can process the sample digital image against all of the previously captured digital images simultaneously. For example, in at least one embodiment, the automatic image capturing system 102 can generate an encoding of the previously captured digital images in the digital image repository 118. The automatic image capturing system 102 can then apply the machine learning model 304 to the sample digital image and the encoding to generate a similarity prediction between the pose of the user from the sample digital image and a pose of the user in at least one previously captured digital image.

The automatic image capturing system 102 can further determine whether at least one similarity prediction satisfies a similarity threshold in an act 328. In one or more embodiments, the machine learning model 304 can generate similarity predictions in various ways. For example, the machine learning model 304 can generate binary similarity predictions (e.g., "true/false," "l/O," "yes/no," "similar/not similar"). In that embodiment, the automatic image capturing system 102 can determine that at least one similarity prediction satisfies the similarity threshold by determining that at least one similarity prediction is positive (e.g., "true," "1," "yes," "similar").

Additionally or alternatively, the machine learning model 304 can generate scalar similarity predictions. For example, the machine learning model 304 can generate a similarity prediction that is a whole-number score from 0 to 100, or a decimal-number score from 0 to 1. In that embodiment, the automatic image capturing system 102 can determine that at least one similarity prediction satisfies the similarity threshold by determining that at least one similarity prediction is equal to or greater than a predetermined score (e.g., a score of 75 or 0.75).

Additionally or alternatively, the automatic image capturing system 102 can utilize a feature vector space to generate a similarity prediction. For example, the automatic image capturing system 102 can encode the sample digital image into a feature vector space where the position of the sample digital image encoding reflects the contents of the sample digital image. The automatic image capturing system 102 can similarly encode a previously captured digital image in the same feature vector space. In one or more embodiments, the automatic image capturing system 102 can determine the distance between the two image encodings in the feature vector space as the similarity prediction. Thus, a greater distance indicates a lower similarity prediction (e.g., the pose of the user in the sample digital image and the pose of the user in the previously captured digital image are likely not similar), while a smaller distance indicates a higher similarity prediction (e.g., the pose of the user in the sample digital image and the pose of the user in the previously captured digital image are likely similar).

As shown in FIG. 3B, the automatic image capturing system 102 can determine that there are no generated similarity predictions that satisfy the similarity threshold (e.g., "No" in the act 328). For example, in response to determining that none of the generated similarity predictions satisfy the similarity threshold, the automatic image capturing system 102 can again repeat the acts 318-328 in an attempt to identify a second sample digital image portraying a pose of the user that is within a threshold level of similarity of a pose of the same user in a previously captured digital image. In additional embodiments, the automatic image capturing system 102 can continue repeating the acts 318-328 until 1) a pose of the user in an additional sample digital image from the camera viewfinder stream is sufficiently similar to a pose of the user in at least one previously captured digital image of the user; or 2) the automatic image capturing system 102 no longer receives the camera viewfinder stream from the client device 108 (e.g., the camera 110 is no longer active on the client device 108).

Additionally or alternatively, the automatic image capturing system 102 can determine that there is at least one generated similarity prediction that satisfies the similarity threshold (e.g., "Yes" in the act 328). For example, as mentioned above, the automatic image capturing system 102 can determine that the similarity prediction associated with a particular image pair (e.g., including the sample digital image and a previously captured digital image) satisfies the similarity threshold by determining that the similarity prediction is positive, or is equal to or greater than a predetermined threshold. By determining that a similarity prediction associated with a particular image pair satisfies the similarity threshold, the automatic image capturing system 102 effectively determines that the pose of the user in the sample image in the image pair is acceptably similar to the pose of the user in the previously captured digital image in the image pair in order to cause a digital image to be automatically captured.

In response to determining that at least one of the similarity predictions satisfy the similarity threshold, the automatic image capturing system 102 automatically causes the camera 110 of the client device 108 to capture a digital image from the camera viewfinder stream in an act 330. For example, the automatic image capturing system 102 can send a signal to the client device 108 with instructions to activate the camera 110 to capture a digital image from the camera viewfinder stream. Additionally or alternatively, the automatic image capturing system 102 can convert the sample digital image to a captured digital image and provide the captured digital image to the client device 108 for storage in the camera roll 116.

In some embodiments, the automatic image capturing system 102 further adds the captured digital image to the repository of previously captured digital images in an act 332. For example, the automatic image capturing system 102 can update the digital image repository (e.g., the digital image repository 118 shown in FIG. 3A) with the captured digital image and any other information and metadata associated with the captured digital image (e.g., one or more of a timestamp, a geotag, a user tag, etc.).

Additionally, the automatic image capturing system 102 periodically updates the machine learning model 304 based on the captured digital image in an act 334. For example, the automatic image capturing system 102 can update and/or re-train the machine learning model 304 in response to determining that a threshold number of new digital images (e.g., including the digital image captured in the act 330) have been added to the digital image repository 118. Additionally or alternatively, the automatic image capturing system 102 can update and/or re-train the machine learning model 304 in response to determining that a threshold amount of time has passed since the last time the automatic image capturing system 102 updated and/or trained the machine learning model 304. Additionally or alternatively, the automatic image capturing system 102 can update and/or re-train the machine learning model 304 in response to determining that the automatic image capturing system 102 has applied the machine learning model 304 to image pairs a threshold number of times.

Figure 4B:
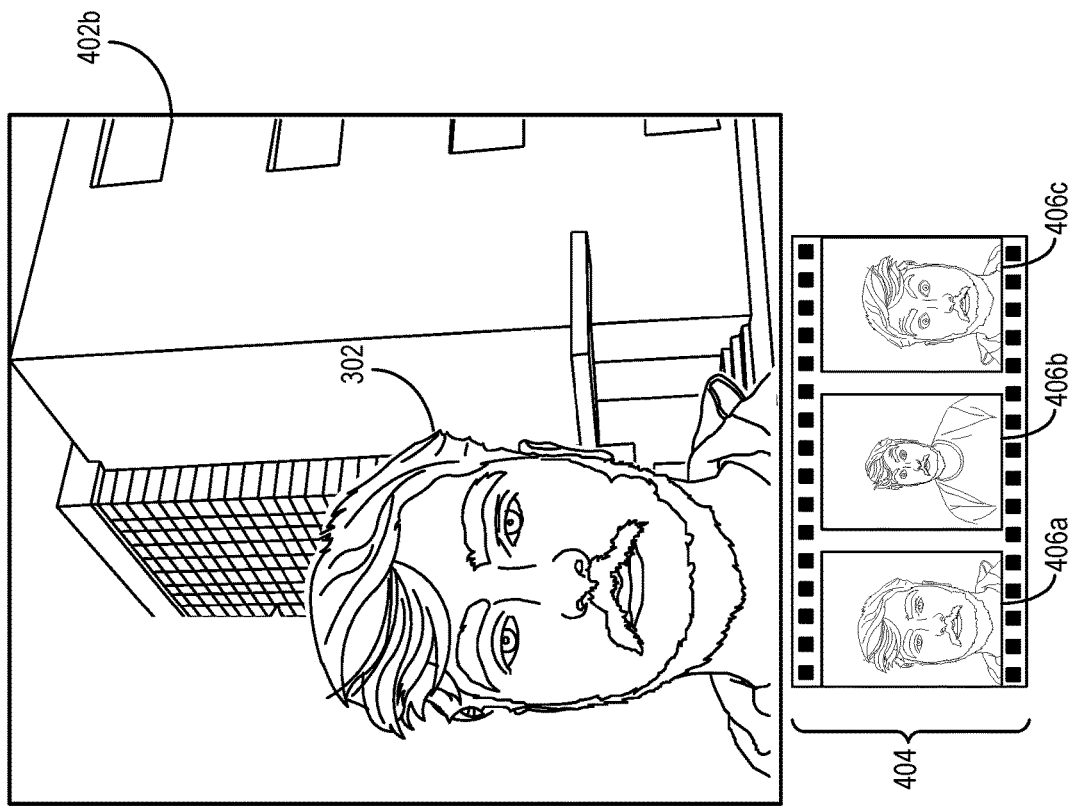
FIGS. 4A and 4B illustrate the automatic image capturing system determining similarities between subtle facial expressions of a user in accordance with one or more embodiments.
Figure 4A:
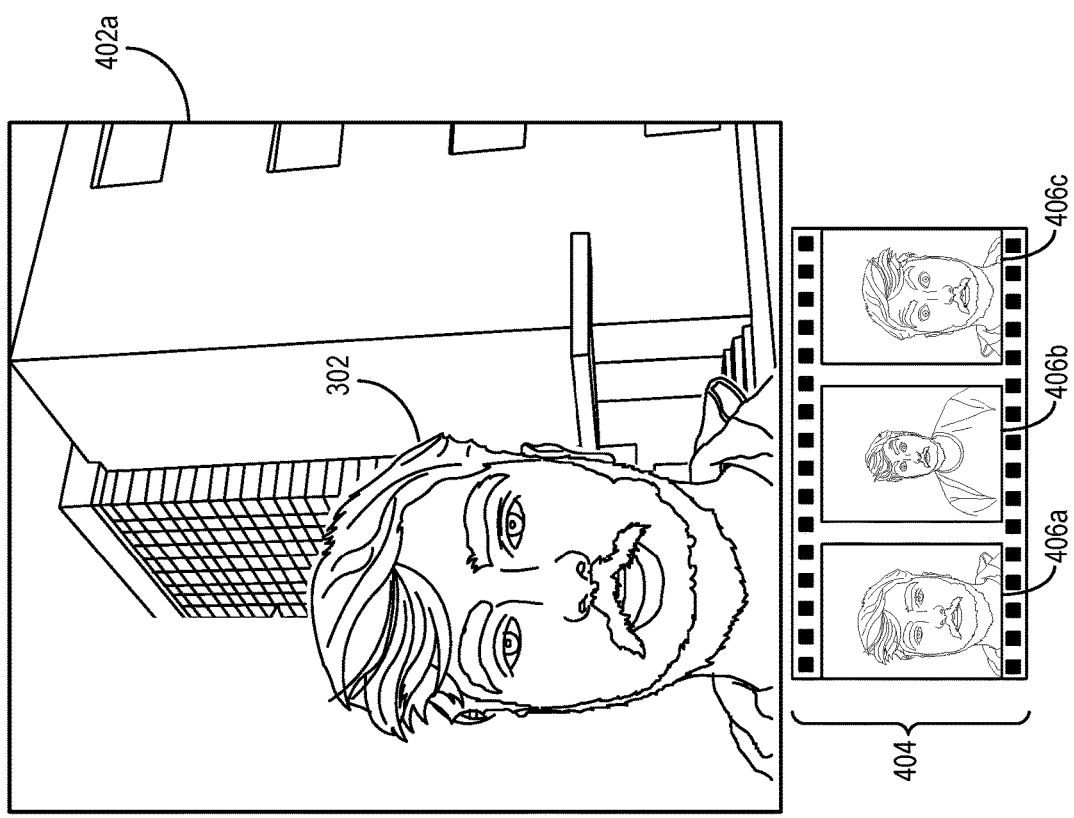

FIGS. 4A and 4B illustrate the automatic image capturing system 102 determining similarities between subtle facial expressions of a user in accordance with one or more embodiments. As discussed above, while conventional systems require users to make a single, predetermined (and often exaggerated) facial expression to trigger automatic selfie capture, the automatic image capturing system 102 automatically captures digital images in response to identifying a threshold similarity between subtle facial expressions of a user utilized in previous digital images. Thus, the automatic image capturing system 102 can automatically capture digital images of a user that include one of a variety of the user's natural and normal facial expressions.

For example, FIG. 4A illustrates a first sample digital image 402a portraying a facial expression (e.g., a smile) of the user 302. As discussed above, the automatic image capturing system 102 can identify the first sample digital image 402a from a camera viewfinder stream of the client device 108 of the user 302. FIG. 4A also shows a collection 404 of previously captured digital images 406a, 406b, 406c, and 406d, each portraying different poses of the user 302. As discussed above, the automatic image capturing system 102 can identify the previously captured digital images 406a-406d from the digital image repository 118 utilizing facial detection models in connection with other models (e.g., a selfie detection model).

In one or more embodiments, the automatic image capturing system 102 can determine not to cause the client device 108 to automatically capture a digital image based on the sample digital image 402a. For example, the automatic image capturing system 102 can generate image pairs including the sample digital image 402a and each of the previously captured digital images 406a-406d, and can apply the machine learning model 304 to each image pair to generate similarity predictions. To illustrate further, the automatic image capturing system 102 can generate a first image pair including the sample digital image 402a and the previously captured digital image 406a, a second image pair including the sample digital image 402a and the previously captured digital image 406b, a third image pair including the sample digital image 402a and the previously captured digital image 406c, and a fourth image pair including the sample digital image 402a and the previously captured digital image 406d. The automatic image capturing system 102 can apply the machine learning model 304 to each of the image pairs to generate four similarity predictions.

The automatic image capturing system 102 can further determine that none of the four similarity predictions satisfy the similarity threshold. For example, the facial expressions of the user 302 in the previously captured digital images 406a-406d indicate that the user tends to prefer or more frequently make somber facial expressions in digital images. Accordingly, the machine learning model 304 can generate similarity predictions that indicate the sample digital image 402a is not similar to any of the previously captured digital images 406a-406d because the user 302 has a smiling facial expression in the sample digital image 402a. Thus, in response to determining that none of the similarity predictions satisfy the similarity threshold, the automatic image capturing system 102 can continue to attempt to identify a second sample digital image from the camera viewfinder of the client device 108 that is similar to at least one of the previously captured digital images 406a-406d.

For example, as shown in FIG. 4B, at some point after identifying the sample digital image 402a, the automatic image capturing system 102 can identify the second sample digital image 402b portraying a facial expression of the user 302. In one or more embodiments, the automatic image capturing system 102 can perform the same acts described above with regard to generating image pairs and applying the machine learning model 304 to the image pairs to generate similarity predictions. In this embodiment, however, the automatic image capturing system 102 can determine that at least one of the similarity predictions satisfies the similarity threshold. Indeed, as shown, the facial expression of the user 302 in the sample digital image 402b (e.g., a somber expression) is similar to the facial expressions of the user in the previously captured digital images 406a-406d. For example, in response to applying the machine learning model 304 to the image pair including the sample digital image 402b and the previously captured digital image 406d to generate a similarity prediction, the automatic image capturing system 102 can determine that the resulting similarity prediction satisfies the similarity threshold. In at least one embodiment, in response to determining that the resulting similarity prediction satisfies the similarity threshold, the automatic image capturing system 102 can cause the camera 110 of the client device 108 to capture a digital image of the user 302.

Figure 5:
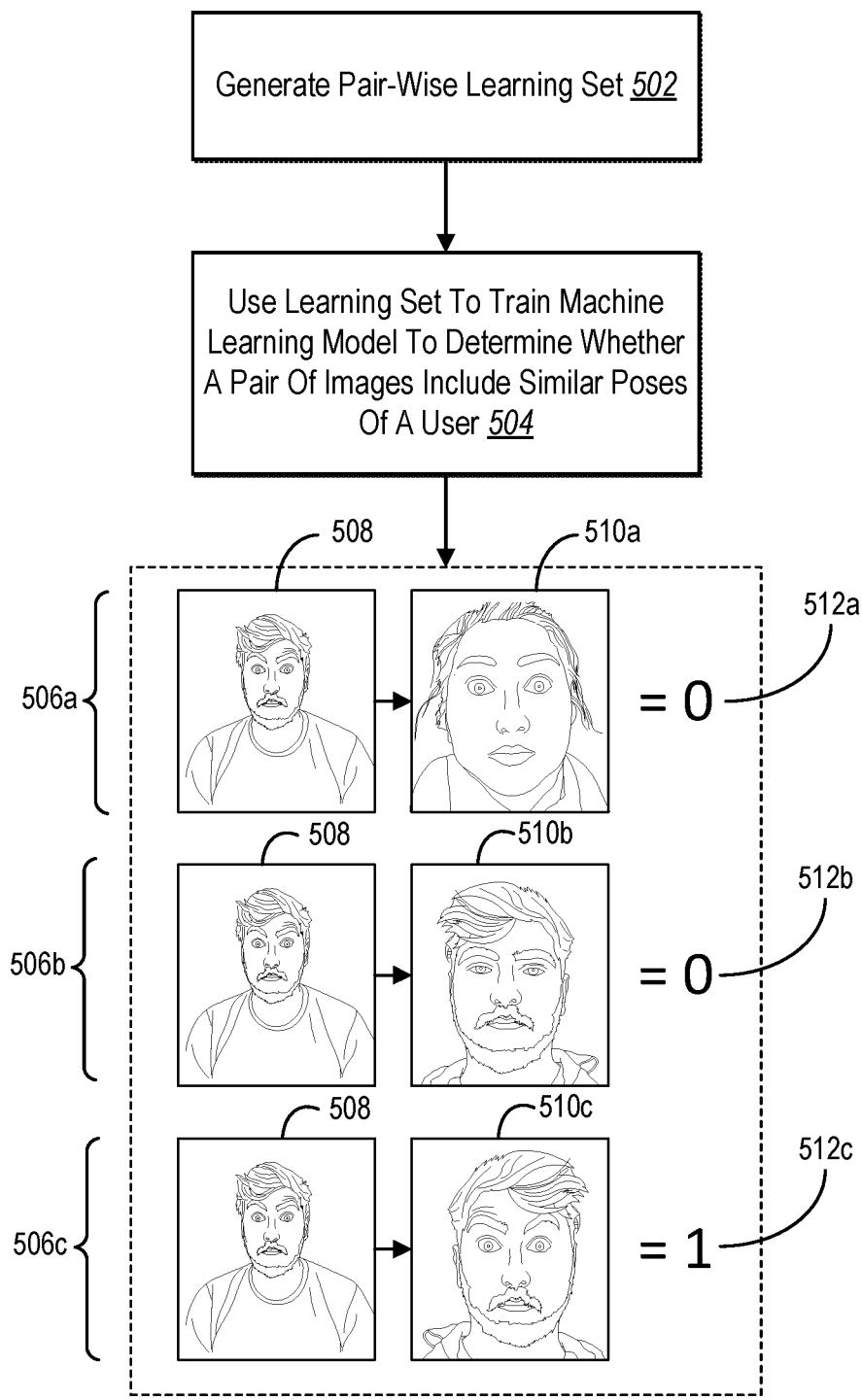
FIG. 5 illustrates a sequence diagram of the automatic image capturing system generating a pair-wise learning set and learning parameters of a machine learning model in accordance with one or more embodiments.

As discussed above, the automatic image capturing system 102 can generate pair-wise learning sets of digital images for training a machine learning model. FIG. 5 illustrates a sequence diagram of the automatic image capturing system 102 generating a pair-wise learning set and learning parameters of the machine learning model 304. As mentioned above, the automatic image capturing system 102 can train the machine learning model 304 utilizing a pair-wise learning set such that the machine learning model 304 can generate an accurate similarity prediction associated with an input image pair. For example, in response to receiving an image pair including a sample digital image portraying a first pose of a user and a previously captured digital image portraying a second pose of the user, the automatic image capturing system 102 trains the machine learning model 304 to generate a similarity prediction indicating: 1) whether the first pose and the second pose are similar, or 2) a level of similarity between the first pose and the second pose.

In one or more embodiments, the automatic image capturing system 102 generates one or more pair-wise learning sets to utilize in training the machine learning model 304 in an act 502. For example, as mentioned above, the automatic image capturing system 102 can generate a pair-wise learning set utilizing digital images in the digital image repository 118. In at least one embodiment, the automatic image capturing system 102 identifies image pairs from the digital images in the digital image repository 118 and determines ground truth labels associated with the identified image pairs.

In more detail, the automatic image capturing system 102 identifies image pairs in the digital image repository 118. For example, the automatic image capturing system 102 can utilize facial recognition to identify the digital images in the digital image repository 118 that portray the same person. To illustrate, the automatic image capturing system 102 can identify digital images in the digital image repository 118 that portray the same person in a selfie, in a body position shot, as a main focus in the digital image, and as a background or group participant in the digital image.

The automatic image capturing system 102 can then generate image pairs utilizing the identified digital images. In one or more embodiments, the automatic image capturing system 102 can generate the image pairs by randomly matching the identified digital images. Additionally or alternatively, the automatic image capturing system 102 can generate the image pairs by matching each digital image with every other digital image. For instance, if the automatic image capturing system 102 identifies four digital images in the digital image repository 118 that portray the same person, the automatic image capturing system 102 can generate six unique image pairs.

In another alternative embodiment, the automatic image capturing system 102 can randomly generate image pairs utilizing all digital images in the digital image repository 118, regardless of the users portrayed in each digital image. For example, the automatic image capturing system 102 can generate these randomized image pairs when the machine learning model 304 includes one or more layers dedicated to determining whether the user in a first digital image of an image pair is the same as the user in a second digital image of the image pair. In an embodiment where the machine learning model 304 does not include these user-recognition layers, the automatic image capturing system 102 can initially filter the generated image pairs to portray the same the user, as discussed above.

After generating the image pairs, the automatic image capturing system 102 can determine ground truths (e.g., ground truth labels) associated with each pair. For example, the automatic image capturing system 102 can apply one or more of an annotation-based model, an image analyzer, a heat map generator, a selfie detection model, and other analysis techniques to a generated image pair to determine a ground truth for the image pair. For instance, the automatic image capturing system 102 determines the ground truth that represents a level of similarity between a first pose of the person in the first digital image in the image pair and a second pose of the person in the second digital image in the image pair. The automatic image capturing system 102 can determine the level of similarity as a binary indicator (e.g., positive or negative), or as a score (e.g., 90% match or a reflection of relative distance in a feature space). The automatic image capturing system 102 can generate the pair-wise learning set including the image pairs and the corresponding ground truths.

In additional or alternative embodiments, the automatic image capturing system 102 can also generate one or more pair-wise learning sets based on one or more video clips. As will be discussed in greater detail below with regard to FIGS. 6A and 6B, the automatic image capturing system 102 can generate a pair-wise learning set based on a video clip by decomposing the video clip into multiple video clip stages and generating positive and negative image pairs including video clip frames from the video clip stages.

As shown in FIG. 5, the automatic image capturing system 102 utilizes the one or more generated pair-wise learning sets to train the machine learning model 304 to determine whether a pair of images includes similar poses of the same user in an act 504. As will be discussed in greater detail below with regard to FIG. 8, the automatic image capturing system 102 trains the machine learning model 304 by 1) applying the machine learning model 304 to the image pairs in the one or more pair-wise learning sets to generate similarity predictions, 2) comparing the generated similarity predictions to the corresponding ground truths in the pair-wise learning sets, and 3) modifying parameters of the machine learning model 304 based on the comparisons.

Ultimately, the automatic image capturing system 102 continues training the machine learning model 304 until the machine learning model 304 generates accurate similarity predictions. To further illustrate, and as shown in FIG. 5, the automatic image capturing system 102 trains the machine learning model 304 to, for example, generate the similarity predictions 512a, 512b, and 512c in response to receiving the image pairs 506a, 506b, and 506c. For example, the automatic image capturing system 102 trains the machine learning model 304 to determine that poses of the same user are similar between two input digital images.

More specifically, in response to receiving the image pair 506a including a sample digital image 508 of a first user with a first facial expression and a first previously captured digital image 510a of a second user, the machine learning model 304 generates the similarity prediction 512a (e.g., "0") indicating that the digital images 508, 510a are not similar because the digital images 508 and 510a do not portray the same person—even though the facial expressions of both people in the digital images 508, 510a is the same or similar. In response to receiving the image pair 506b including the sample digital image 508 of the first user with the first facial expression and a second previously captured digital image 510b of the first user with a second facial expression, the machine learning model 304 generates the similarity prediction 512b (e.g., "0") indicating that the digital images 508, 510b are not similar because the first and second facial expressions of the first user are not similar. Additionally, in response to receiving the image pair 506c including the sample digital image 508 of the first user with the first facial expression and a third previously captured digital image 510c of the first user with a third facial expression, the machine learning model 304 generates the similarity prediction 512c (e.g., "1") indicating that the digital images 508, 510c are similar because the first and third facial expressions of the first user are similar.

In one or more embodiments, the automatic image capturing system 102 determines that an image pair satisfies a similarity threshold based on the generated similarity prediction, as discussed above. For example, if the generated similarity prediction is binary (e.g., as with the similarity predictions 512a-512c), the automatic image capturing system 102 can determine that an image pair satisfies the similarity threshold if the similarity prediction is "1." In other words, the similarity threshold is that the similarity prediction equals "1".

Alternatively, if the generated similarity prediction is non-binary (e.g., the similarity prediction is a score), the automatic image capturing system 102 can determine that an image pair satisfies the similarity threshold if the similarity prediction is greater than or equal to the similarity threshold. Moreover, in one embodiment, the machine learning model 304 may include an intermediate layer that determines whether the similarity prediction score satisfies the similarity threshold. In that embodiment, the machine learning model 304 may generate a binary output of "1" if the intermediate layer determines that the score satisfies the similarity threshold, or may generate a binary output of "0" if the intermediate layer determines that the score does not satisfy the similarity threshold.

As mentioned above, the automatic image capturing system 102 generates one or more pair-wise learning sets based on the digital image repository 118 and/or other digital images. In one or more embodiments, the automatic image capturing system 102 generates a pair-wise learning set based on one or more video clips. For example, the automatic image capturing system 102 can analyze video clips of people starting at a neutral facial expressions, transitioning to a peak facial expressions (e.g., a surprised facial expression, an angry facial expression), making the peak facial expressions, transitioning back to the neutral facial expressions, and again making the neutral facial expressions. While each of these video clips may only be a few seconds long, each video clip includes multiple video clip frames. And each video clip frame associated with a video clip portrays the same user with one of various facial expressions.

Figure 6A:
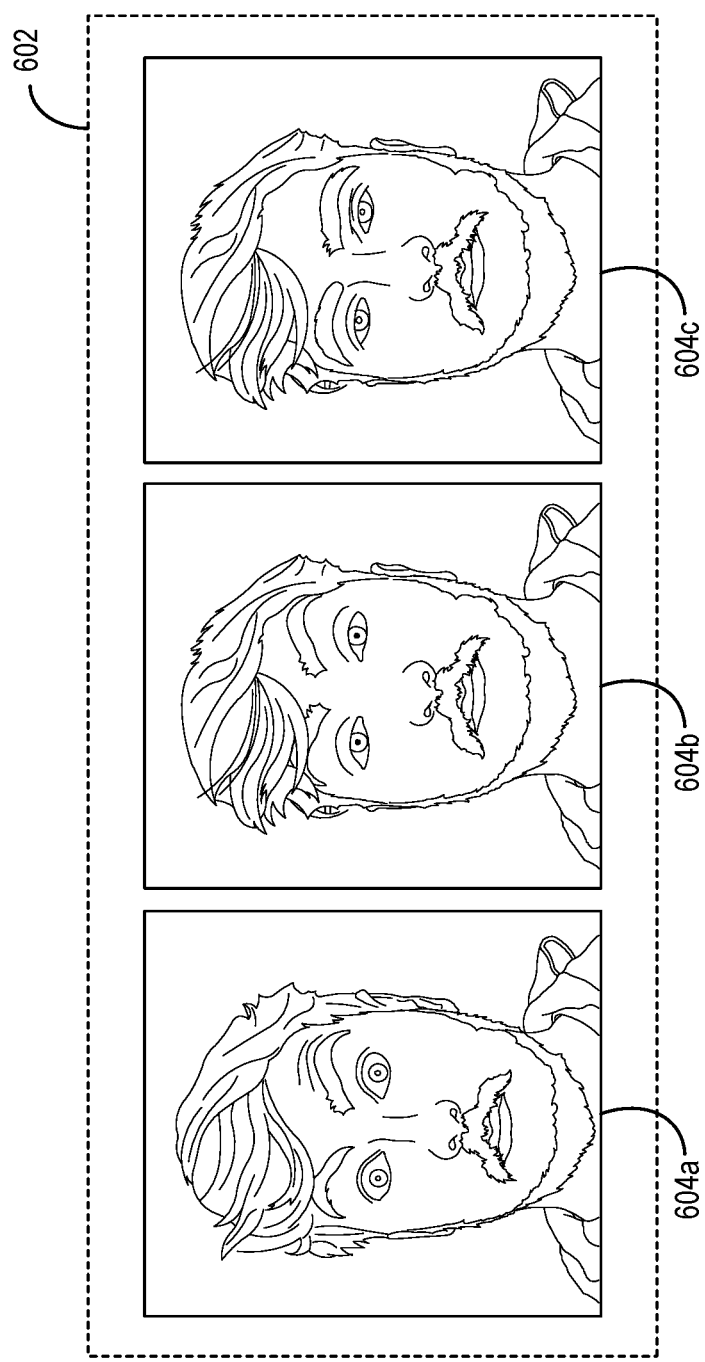
FIGS. 6A and 6B illustrate the automatic image capturing system generating triplets of video clip frames from a video clip for use in training a machine learning model in accordance with one or more embodiments.

As illustrated in FIG. 6A, the automatic image capturing system 102 analyzes the video clip frames of a video clip to identify triplets of video clip frames. The automatic image capturing system 102 then generates positive and negative image pairs based on the identified triplets to including in a pair-wise learning set for use in training the machine learning model 304. For example, the automatic image capturing system 102 can identify the triplet 602 including the video clip frames 604a, 604b, and 604c. Each of the video clip frames 604a-604c portray the same person where the video clip frame 604a portrays the person with a first facial expression (e.g., a peak surprised facial expression), the video clip frame 604b portrays the person with a second facial expression (e.g., a transitional facial expression), and the video clip frame 604c portrays the person with a third facial expression (e.g., a neutral facial expression).

The automatic image capturing system 102 can utilize the triplet 602 to determine a positive image pair and a negative image pair. For example, the automatic image capturing system 102 can determine that a positive image pair (e.g., an image pair where both digital images portray the same person with similar facial expressions) includes the video clip frame 604a and the video clip frame 604b. Additionally, the automatic image capturing system 102 can determine that a negative image pair (e.g., an image pair where both digital images portray the same person with dissimilar facial expressions) includes the video clip frame 604a and the video clip frame 604c.

Figure 6B:
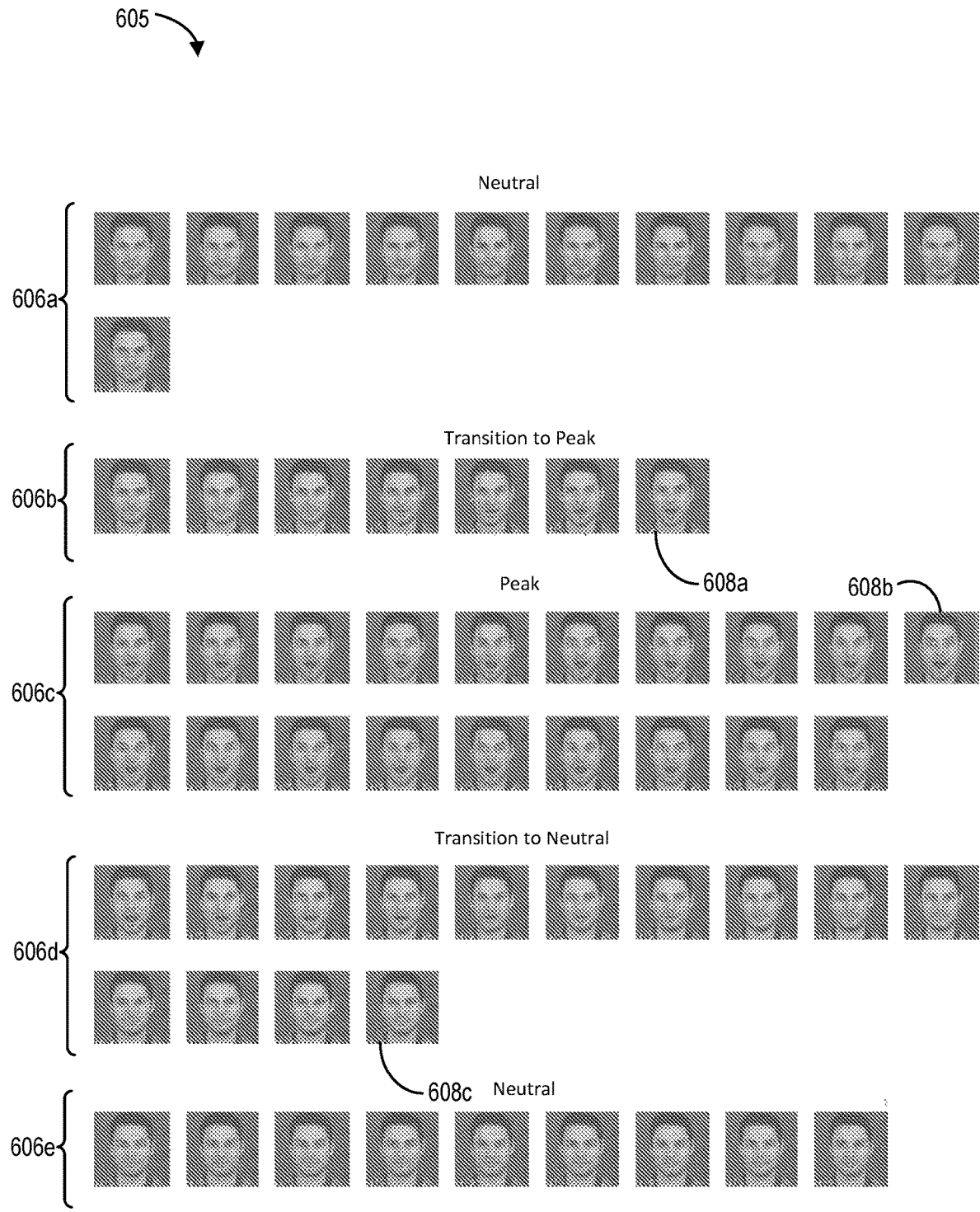

FIG. 6B illustrates additional information with regard to how the automatic image capturing system 102 identifies triplets of video clip frames from stages of a video clip. As mentioned above, the automatic image capturing system 102 identifies triplets of video clip frames from various stages of a video clip in order to generate positive image pairs and negative image pairs for use in training the machine learning model 304.

As shown in FIG. 6B a video clip 605 includes multiple video clip frames. In one or more embodiments, the automatic image capturing system 102 decomposes the video clip 605 into multiple stages 606a, 606b, 606c, 606d, and 606e. As will be described in greater detail below with regard to FIG. 7, the automatic image capturing system 102 decomposes the video clip 605 into the stages 606a-606e utilizing one or more decomposition algorithms. The resulting stages 606a-606e each include a number of sequentially ordered video clip frames, where the video clip frames in each stage represent a type of facial expression (e.g., "neutral," "transition to peak," "peak," "transition to neutral," "neutral") associated with the person portrayed therein.

To illustrate, the automatic image capturing system 102 decomposes the video clip 605 into the stage 606a based on the video clip frames therein portraying the person with initial neutral facial expressions. Additionally, the automatic image capturing system 102 decomposes the video clip 605 into the stage 606b based on the video clip frames therein portraying the person with transitional facial expressions that are transitioning to a peak facial expression. Moreover, the automatic image capturing system 102 decomposes the video clip 605 into the stage 606c based on the video clip frames therein portraying the person with peak facial expressions. The automatic image capturing system 102 decomposes the video clip 605 into the stage 606d based on the video clip frames therein portraying the person with transitional facial expressions that are transitioning back to a neutral expression. And the automatic image capturing system 102 decomposes the video clip 605 into the stage 606e based on the video clip frames therein portraying the person with final neutral facial expressions.

In one or more embodiments, the automatic image capturing system 102 identifies a triplet of video clip frames from among the stages 606a-606e. For example, the automatic image capturing system 102 utilizes a first heuristic that specifies a triplet of video clip frames should include a first video clip frame portraying the person with a peak expression, a second video clip frame portraying the person with a transitional expression that is transitioning to the peak expression, and a third video clip frame portraying the person with another transitional expression that is transitioning back to a neutral expression. To satisfy the first heuristic, the automatic image capturing system 102 identifies a triplet of video clip frames from the video clip 605 by utilizing the stage 606b (e.g., transitioning to peak expressions), the stage 606c (e.g., peak expressions), and the stage 606d (e.g., transitioning to neutral expressions). For example, the automatic image capturing system 102 can select: the first video clip frame of the triplet from the stage 606c, the second video clip frame of the triplet from the stage 606b, and the third video clip frame of the triplet from the stage 606d.

Moreover, the automatic image capturing system 102 can further select the triplet according to an additional second heuristic that specifies that there is a smaller time difference between the first video clip frame and the second video clip frame in the triplet than there is between the first video clip frame and the third video clip frame in the triplet. For example, in order to ensure that there is a smaller time difference between the first video clip frame and the second video clip frame than there is between the first video clip frame and the third video clip frame (in keeping with the second heuristic), the automatic image capturing system 102 first identifies the first video clip frame as the peak video clip frame for the video clip 605. To illustrate, the automatic image capturing system 102 identifies a peak video clip frame 608b as the median video clip frame in the stage 606c of peak expression video clip frames.

Next, the automatic image capturing system 102 identifies the second video clip frame in the triplet as the video clip frame 608a in the stage 606b of transitional expressions. For example, the automatic image capturing system 102 selects the video clip frame 608a as the second video clip frame in the triplet because the time difference between the video clip frame 608a and the peak video clip frame 608b is smaller than the time difference between any other video clip frame in the stage 606b and the peak video clip frame 608b.

Additionally, the automatic image capturing system 102 identifies the third video clip frame in the triplet as the video clip frame 608c in the stage 606d of transitional expressions. For example, the automatic image capturing system 102 selects the video clip frame 608c as the third video clip frame in the triplet because the time difference between the video clip frame 608c and the peak video clip frame 608b is greater than the time difference between any other video clip frame in the stage 606d and the peak video clip frame 608b.

Thus, after decomposing the video clip 605 into the stages 606a-606e, the automatic image capturing system 102 identifies the triplet of video clip frames including the peak video clip frame 608b, the video clip frame 608a from the stage 606b, and the video clip frame 608c from the stage 606d. As discussed above, the automatic image capturing system 102 can further utilize the triplet to identify a positive image pair including the peak video clip frame 608b and the video clip frame 608a, and a negative image pair including the peak video clip frame 608b and the video clip frame 608c.

In additional or alternative embodiments, automatic image capturing system 102 can identify the triplet of video clip frames in other ways. For example, the automatic image capturing system 102 may select video clip frames of a triplet from other stages of the video clip. To illustrate, the automatic image capturing system 102 may select the first video clip frame from the first video clip stage and the last video clip from the last video clip stage. Additionally or alternatively, the automatic image capturing system 102 may select the video clip frames from different positions in the stages 606b, 606c, and 606d. Additionally or alternatively, the automatic image capturing system 102 may select the video clip frames based on different time differences between the frames. For instance, the automatic image capturing system 102 may select a third video clip frame that is closer in time to the peak video frame than the peak video frame is to the first video clip frame.

Figure 7:
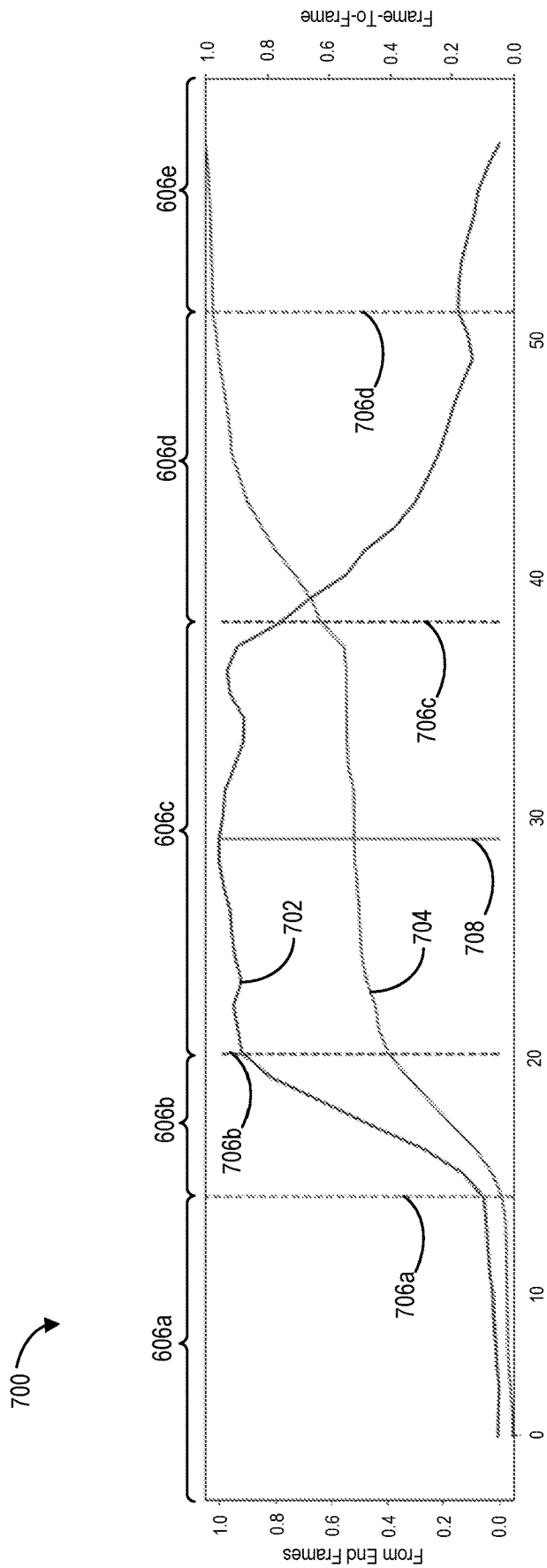
FIG. 7 illustrates the automatic image capturing system decomposing a video clip into multiple stages in accordance with one or more embodiments.

FIG. 7 illustrates the automatic image capturing system 102 decomposing the video clip 605 into the multiple stages 606a-606e. For example, in one or more embodiments, the automatic image capturing system 102 utilizes multiple scoring algorithms in connection with the video clip frames of the video clip 605 and applies a fine-tuned threshold function to retrieve the stages 606a-606e. In one or more embodiments, the automatic image capturing system 102 utilizes a frame-by-frame distance scoring algorithm and a frame-to-end-frame distance scoring algorithm in connection with the video clip frames of the video clip 605 to identify the stages 606a-606e.

For example, a frame-by-frame distance scoring algorithm includes an algorithm applied to ordered video clip frames in a video clip. For example, the automatic image capturing system can determine a frame-by-frame distance score for an $n^{th}$ video clip frame from a video clip by identifying the pixel level distance between the $n^{th}$ video clip frame and the $n-1^{th}$ video clip frame from the same video clip. In one or more embodiments, the automatic image capturing system utilizes optical flow to determine this pixel level distance. Additionally, for example, frame-to-end-frame distance scoring algorithm includes an algorithm applied to a collection of video clip frames in a video clip. For example, the automatic image capturing system can determine a frame-to-end-frame distance score for an $n^{th}$ video clip frame from a video clip by identifying the pixel level distance between the $n^{th}$ video clip frame and an end video clip frame (e.g., a front-end frame at the beginning or back-end frame at the conclusion) from the same video clip. For instance, the frame-to-end-frame distance score for an $n^{th}$ video clip frame can include the pixel level distance between the $n^{th}$ video clip frame and the last video clip frame from the video clip, or the first video clip frame from the video clip. In one or more embodiments, the automatic image capturing system utilizes optical flow to determine this pixel level distance.

FIG. 7 illustrates a graph showing different pixel level distance scores associated with each video clip frame in a video clip (e.g., the video clip 605 illustrated in FIG. 6B). The graph 700 includes pixel level distances on the y-axis and video clip frame numbers on the x-axis. The automatic image capturing system 102 can generate an averaged frame difference graph line 702 and an accumulated frame-by-frame difference graph line 704. The automatic image capturing system 102 further applies one or more threshold functions to the averaged frame difference graph line 702 and the accumulated frame-by-frame difference graph line 704 to generate the decision boundaries 706a, 706b, 706c, and 706d. As further shown in FIG. 7, the automatic image capturing system 102 decomposes the video clip frames into the stages 606a-606e based on the decision boundaries 706a-706d.

In more detail, the automatic image capturing system 102 generates the averaged frame difference graph line 702. For example, the averaged frame difference graph line 702 represents the averaged pixel level distances between the digital video frames and each of the end digital video frames of the video clip 605. More specifically, the automatic image capturing system 102 generates a point on the average frame difference graph line 702 associated with an $n^{th}$ video clip frame in the video clip 605 by determining a first pixel level distance between the $n^{th}$ video clip frame and the first video clip frame in the video clip 605. The automatic image capturing system 102 then determines a second pixel level distance between the $n^{th}$ video clip frame and the last video clip frame in the video clip 605. The automatic image capturing system 102 determines the coordinates of a point on the average frame difference graph line 702 associated with the $n^{th}$ video clip frame by utilizing the $n^{th}$ video clip frame's position in the video clip 605 as the x-value, and the average of the first and second pixel level distances as the y-value. As such, and as shown in FIG. 7, the average frame difference graph line 702 associated with the video clip 605 is roughly bell-curve shaped as the video clip 605 portrays the person making facial expressions that change from neutral to peak, and then back to neutral. In additional or alternative embodiments, the automatic image capturing system 102 can determine the y-value associated with the $n^{th}$ video clip frame based on first and second pixel level distances between the $n^{th}$ video clip and other reference frames within the video clip 605 (e.g., rather than the first video clip frame and the last video clip frame).

Additionally, the automatic image capturing system 102 generates the accumulated frame-by-frame difference graph line 704 by determining pixel level distances between pairs of successive video clip frames in the video clip 605. For example, the automatic image capturing system 102 determines the coordinates of a point on the accumulated frame-by-frame difference graph line 704 associated with the $n^{th}$ video clip frame by utilizing the $n^{th}$ video clip frame's position in the video clip 605 as the x-value, and the pixel level distance between the $n^{th}$ video clip frame and the $n-1^{th}$ video clip frame added to an accumulated distance as the y-value. More specifically, every time the automatic image capturing system 102 determines a pixel level distance between two successive video clip frames, the automatic image capturing system 102 adds the determined distance to the accumulated distance for the video clip 605. Thus, as shown in FIG. 7, the accumulated frame-by-frame difference graph line 705 associated with the video clip 605 has multiple plateaus (e.g., corresponding to stages where the person's expression changes very little), and multiple inclines (e.g., corresponding to stages where the person's expressions are transitioning). Additionally or alternatively, the automatic image capturing system 102 may utilize a non-cumulative frame-by-frame difference. For example, the automatic image capturing system 102 can determine the coordinates a point on the graph line 704 associated with the $n^{th}$ video clip frame by utilizing the $n^{th}$ video clip frame's position in the video clip 605 as the x-value, and the pixel level distance between the $n^{th}$ video clip frame and the $n-1^{th}$ video clip frame as the y-value.

When determining pixel level distances between pairs of video clip frames, the automatic image capturing system 102 can utilize a pixel level distance determining algorithm such as, for example, the Optical Flow Algorithm. For example, the pixel level distance determining algorithm can analyze a pair of video clip frames to generate a distance between zero and one. In one or more embodiments, a pixel level distance closer to one indicates that the two video clip frames are not similar (e.g., as when the person portrayed in the frames is changing a facial expression), while a pixel level distance closer to zero indicates that the two video clip frames are similar (e.g., as when the person portrayed in the frames is not changing a facial expression).

After generating the averaged frame difference graph line 702 and the accumulated frame-by-frame difference graph line 704, the automatic image capturing system 102 generates the decision boundaries 706a-706d. For example, the automatic image capturing system 102 can generate the decision boundaries 706a-706d by applying one or more threshold functions to the averaged frame difference graph line 702 and the accumulated frame-by-frame difference graph line 704. In more detail, the automatic image capturing system 102 can apply the one or more threshold functions to identify points along the graph lines 702, 704 that are: a minimum distance from each other, beginning to diverge from each other, a maximum distance from each other, both beginning to plateau, or experiencing a threshold level of increase or decrease. Based on the determinations of these one or more threshold functions, the automatic image capturing system 102 can identify: the decision boundary 706a representing a video clip frame where the automatic image capturing system 102 determines the graph lines 702, 704 experience a threshold level of divergence; the decision boundary 706b representing a video clip frame where the automatic image capturing system 102 determines the graph lines 702, 704 experience the beginning of a plateau; the decision boundary 706c representing a video clip frame where the automatic image capturing system 102 determines the graph lines 702, 704 experience a threshold level of change, and the decision boundary 706d where the automatic image capturing system 102 determines the graph lines 702, 704 experience a second plateau. In at least one embodiment, the automatic image capturing system 102 identifies a peak boundary 708 as a median frame in between the decision boundary 706b and the decision boundary 706c.

Additionally or alternatively, the automatic image capturing system 102 can determine the boundaries 706a-706d and 708 based on adding the graph lines 702, 704 together. For example, the automatic image capturing system 102 can normalize the y-values of graph lines 702, 704 (e.g., between 0 and 1), and add the y-values together to generate a curve. The automatic image capturing system 102 can then position the boundaries 706a-706d and 708 based on different percentiles of area under the curve. For example, the automatic image capturing system 102 can position the boundaries 706a-706d and 708 based on the $10^{th}$ percentile, the $40^{th}$ percentile, the $50^{th}$ percentile, the $60^{th}$ percentile, and the $80^{th}$ percentile of area under the resulting curve.

As mentioned above, the automatic image capturing system 102 decomposes the frames of the video clip 605 into the stages 606a-606e based on the decision boundaries 706a-706d. For example, the automatic image capturing system 102 can divide the frames of the video clip 605 into the stages 606a-606e because the decision boundaries 706a-706d mark delineations of frame numbers or identifiers along the x-axis. Thus, the automatic image capturing system 102 can decompose the frames 1-11 into the stage 606a, the frames 12-18 into the stage 606b, the frames 19-37 into the stage 606c, the frames 38-51 into the stage 606d, and the frames 52-60 into the stage 606e.

Figure 8:
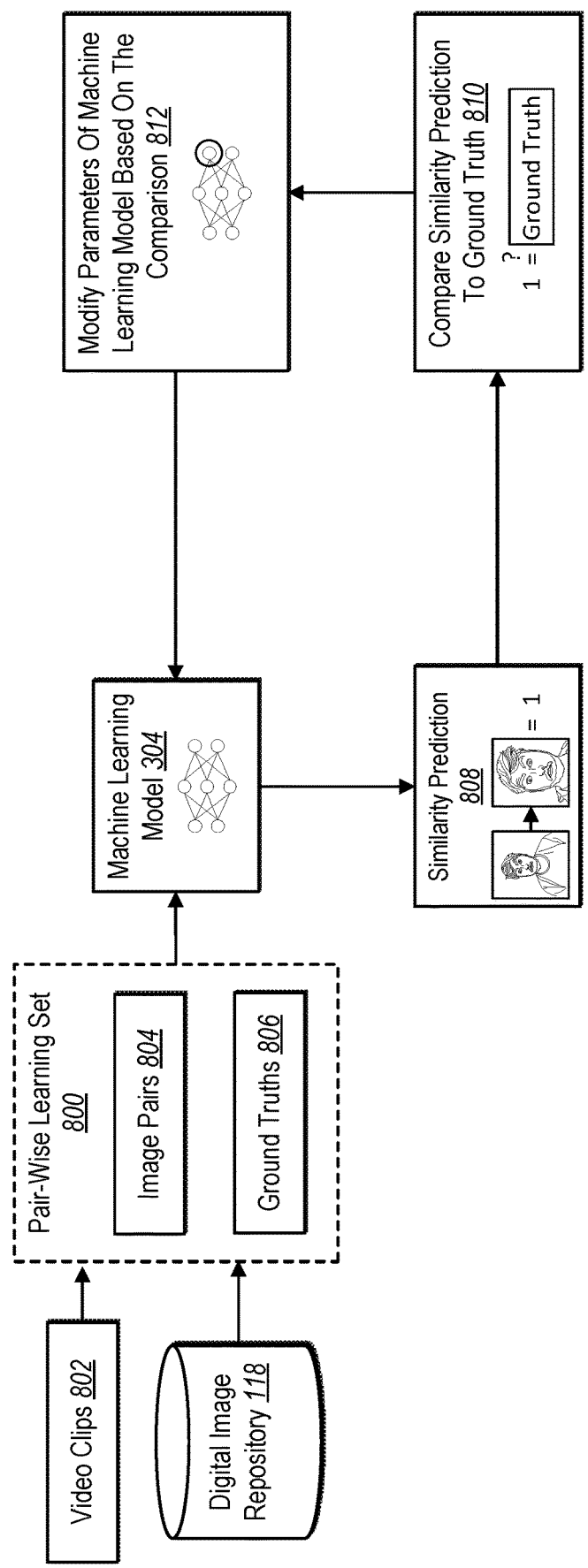
FIG. 8 illustrates the automatic image capturing system training a machine learning model in accordance with one or more embodiments.

FIG. 8 illustrates the automatic image capturing system 102 training the machine learning model 304 in accordance with one or more embodiments. As discussed above, the automatic image capturing system 102 trains the machine learning model 304 to determine whether a first pose of a person in a first digital image is similar to a second pose of the same person in a second digital image. Specifically, as shown in FIG. 8, the automatic image capturing system 102 generates a pair-wise learning set 800. For example, the automatic image capturing system 102 trains the machine learning model 304 based on image pairs 804 generated based on one or more of video clips 802 and the digital image repository 118, and ground truths 806 corresponding the image pairs 804. In one or more embodiments, the automatic image capturing system 102 trains the machine learning model 304 by providing an image pair from the pair-wise learning set 800 to the machine learning model 304 as an input vector, comparing the similarity prediction generated by the machine learning model 304 to ground truth that corresponds to the image pair, and then modifying the parameters of the machine learning model 304 based on the comparison. This process will now be described in greater detail.

As shown in FIG. 8, the pair-wise learning set 800 includes image pairs 804 and corresponding ground truths 806. In one or more embodiments, the image pairs 804 include positive image pairs and negative image pairs. For example, in at least one embodiment, positive image pairs include two digital images portraying the same person in similar poses. Similarly, in at least one embodiment, the negative image pairs include two digital images portraying one of: the same person in dissimilar poses, different people in similar poses, or different people in dissimilar poses.

As discussed above, the automatic image capturing system 102 generates the image pairs 804 in the pair-wise learning set 800 utilizing one or more of the video clips 802 and the digital image repository 118. For example, the automatic image capturing system 102 generates image pairs utilizing the video clips 802 based on triplets of video clip frames. More specifically, the automatic image capturing system 102 identifies a positive image pair and a negative image pair from the same triplet of video clip frames. The automatic image capturing system 102 also generates image pairs utilizing the digital image repository 118 by identifying all pair combinations among the digital images in the digital image repository 118.

Each of the image pairs 804 corresponds to one of the ground truths 806. For example, every positive image pair generated from a video clip frame triplet corresponds to a positive ground truth. Additionally, every negative image pair generated from a video clip frame triplet corresponds to a negative ground truth. As discussed above, the automatic image capturing system 102 can determine a ground truth for every image pair identified in the digital image repository 118. Thus, every image pair identified in the digital image repository 118 corresponds to its generated ground truth.

To begin training the machine learning model 304, the automatic image capturing system 102 provides an image pair from the pair-wise learning set 800 as an input to the machine learning model 304. In one or more embodiments, the machine learning model analyzes each digital image in the image pair, passes latent feature vectors between each sequential layer in the machine learning model 304 to retain and encode features of the digital images, pools prediction results, and generates a prediction of whether a pose of a person portrayed in the first digital image is similar to a pose of the same person in the second digital image. As mentioned above, in one or more embodiments, the generated similarity prediction can be binary (e.g., "yes" or "no") or can be a score.

After the machine learning model 304 generates the similarity prediction 808, the automatic image capturing system 102 continues training the machine learning model 304 by performing an act 810 of comparing the generated similarity prediction to a corresponding ground truth. For example, as discussed above, for each image pair 804, the pair-wise learning set 800 includes a corresponding ground truth 806. Each ground truth 806 indicates whether the corresponding image pair portrays the same user in similar poses. As such, the 810 can involve the automatic image capturing system 102 determining whether the similarity prediction generated by the machine learning model 304 matches the ground truth that corresponds to the image pair input.

To continue training the machine learning model 304, the automatic image capturing system 102 performs an act 812 of modifying parameters of the machine learning model 304 based on the comparison performed in the act 810. For example, based on this comparison, the automatic image capturing system 102 can modify parameters of one or more layers of the machine learning model 304 to reduce the measure of loss. To illustrate, the automatic image capturing system 102 can apply a loss function to determine a measure of loss, where a greater measure of loss indicates a larger disparity between the generated similarity prediction and the corresponding ground truth, and a smaller measure of loss indicates a smaller disparity between the generated similarity prediction and the corresponding ground truth. In one or more embodiments, the automatic image capturing system 102 can utilize one or more loss functions to determine the measure of loss including, but not limited to: mean squared error, likelihood loss, and cross entropy loss.

In one or more embodiments, the automatic image capturing system 102 can modify parameters of the machine learning model 304 through back-propagation of the measure of loss from the loss function. For example, the automatic image capturing system 102 determines the measure of loss based on applying the loss function to the generated predictions in connection with the ground truths 806. The automatic image capturing system 102 then back-propagates that measure of loss to modify parameters of the machine learning model in order to minimize the measure of loss associated with future comparisons of additional generated predictions and ground truths.

In one or more embodiments, the automatic image capturing system 102 continues training the machine learning model 304 until either the pair-wise learning set 800 is exhausted or the measure of loss converges (e.g., satisfies a threshold convergence value and/or is stable over a threshold number of training cycles). The automatic image capturing system 102 may periodically retrain the machine learning model 304 in the same manner illustrated in FIG. 8. Once training of the machine learning model 304 is complete, the automatic image capturing system 102 can apply the machine learning model 304 to unknown image pair inputs (e.g., image pairs with no corresponding ground truths).

Figure 9:
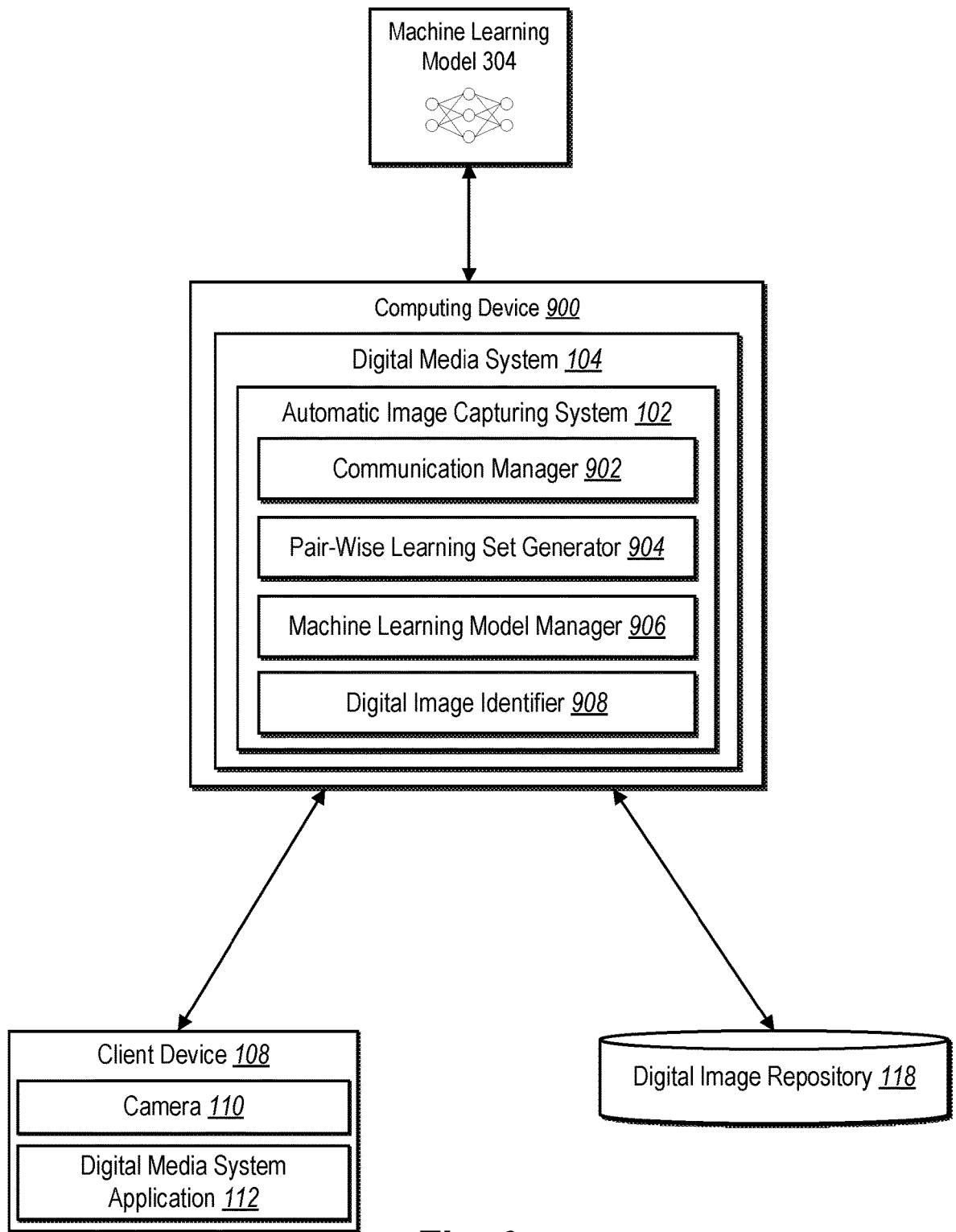
FIG. 9 illustrates a schematic diagram of the automatic image capturing system in accordance with one or more embodiments.

FIG. 9 illustrates a detailed schematic diagram of an embodiment of the automatic image capturing system 102 operating on a computing device 900 in accordance with one or more embodiments. As discussed above, the automatic image capturing system 102 can operate on a variety of computing devices. Thus, for example, the computing device 900 can include the server(s) 106 and/or the client device 108. In one or more embodiments, the automatic image capturing system 102 includes a communication manager 902, a pair-wise learning set generator 904, a machine learning model manager 906, and a digital image identifier 908.

As mentioned above, and as shown in FIG. 9, the automatic image capturing system 102 includes the communication manager 902. In one or more embodiments, the communication manager 902 handles all communications for the computing device 900 (e.g., digital communications between the server(s) 106 and the client device 108, between different components of the server(s) 106, and/or between different components of the client device 108). For example, the communication manager 902 receives a camera viewfinder stream from the client device 108. The communication manager 902 can also provide instructions to the client device 108 that cause the client device 108 to capture a digital image (e.g., a selfie digital image).

As mentioned above, and as shown in FIG. 9, the automatic image capturing system 102 includes the pair-wise learning set generator 904. In one or more embodiments, the pair-wise learning set generator 904 generates one or more pair-wise learning sets based on one or more of the digital image repository 118 and video clips. For example, the pair-wise learning set generator 904 generates a pair-wise learning set based on the digital image repository 118 by generating image pairs including one or more combinations of digital images from the digital image repository 118. The pair-wise learning set generator 904 then determines ground truths for each generated image pair by utilizing image analysis techniques and models (and/or user annotations). The pair-wise learning set generator 904 generates a ground truth for an image pair that indicates whether 1) both images portray the same person, and 2) a pose of the person in the first digital image in the image pair is similar to a pose of the person in the second digital image in the image pair.

Additionally, pair-wise learning set generator 904 generates a pair-wise learning set based on one or more video clips. For example, the pair-wise learning set generator 904 decomposes a video clip into various stages utilizing one or more of a frame-by-frame distance scoring algorithm, and a frame-to-end-frame distance scoring algorithm. The pair-wise learning set generator 904 then identifies a triplet of video clip frames by identifying a peak video clip frame from a first stage, a transitional video clip frame from a second stage, and another transitional video clip frame from a third stage. In one or more embodiments, the pair-wise learning set generator 904 selects the triplet of video clip frames according to a first heuristic that specifies a triplet of video clip frames should include a first video clip frame portraying the person with a peak expression, a second video clip frame portraying the person with a transitional expression that is transitioning to the peak expression, and a third video clip frame portraying the person with another transitional expression that is transitioning back to a neutral expression. The pair-wise learning set generator 904 further selects the triplet of video clip frames according to a second heuristic that specifies that there is a smaller time difference between the first video clip frame and the second video clip frame than there is between the first video clip frame and the third video clip frame.

The pair-wise learning set generator 904 further generates the pair-wise learning set based on the identified triplet of video clip frames by sampling a positive image pair and a negative image pair from the triplet. For example, the pair-wise learning set generator 904 samples the positive image pair as the first and second video clip frames in the triplet. The pair-wise learning set generator 904 further samples the negative image pair as the first and third video clip frames in the triplet. The pair-wise learning set generator 904 can generate a ground truth for each sampled image pair that indicates whether the image pair is positive or negative.

As mentioned above, and as shown in FIG. 9, the automatic image capturing system 102 includes the machine learning model manager 906. In one or more embodiments, the machine learning model manager 906 trains, maintains, applies, and re-trains the machine learning model 304. For example, the machine learning model manager 906 trains the machine learning model 304, utilizing the generated pair-wise learning sets, to generate similarity predictions. Specifically, the machine learning model manager 906 trains the machine learning model 304 to generate a similarity prediction associated with an image pair that indicates whether a pose of a person in a first digital image in the image pair is similar to a pose of the person in a second digital image in the image pair. The machine learning model manager 906 can periodically re-train the machine learning model 304.

The machine learning model manager 906 can further apply the trained machine learning model 304 to unknown inputs. For example, the machine learning model manager 906 can generate an input vector including a sample digital image and a previously captured digital image, and apply the machine learning model 304 to the generated input vector. The machine learning model manager 906 can further provide the similarity prediction generated by the machine learning model 304 to the digital image identifier 908 for further analysis.

As mentioned above, and as shown in FIG. 9, the automatic image capturing system 102 includes the digital image identifier 908. In one or more embodiments, the digital image identifier 908 identifies a sample digital image from a camera viewfinder stream portraying a pose of a user. In one embodiment, the digital image identifier 908 can extract a sample digital image from the camera viewfinder stream at regular intervals (e.g., every second, every 15 frames). In another embodiment, in order to avoid capturing an erroneous sample digital image (e.g., an image of something other than a person), the digital image identifier 908 can apply one or more models to image frames from the camera viewfinder stream in order to identify a sample digital image that appropriately triggers the processes of the automatic image capturing system 102 (e.g., an image of a person in a pose). For example, the digital image identifier 908 can apply one or more models (e.g., a selfie detection model, a body position model) to frames of the camera viewfinder stream to identify the sample digital image portraying a pose of the user of the client device 108.

In one or more embodiments, the digital image identifier 908 identifies one or more previously captured digital images portraying one or more poses of the same user. For example, the digital image identifier 908 utilizes facial detection models and other image analysis to identify one or more previously captured digital images in the digital image repository 118 that portray the same user as is portrayed in the sample digital image. The digital image identifier 908 can further analyze the identified previously captured digital images to identify specific previously captured digital images that portray selfies of the user, body positions of the user, and/or facial expressions of the user. To illustrate, the digital image identifier 908 can generate pair-wise inputs including the sample digital image in combination with the previously captured digital images, and apply a facial recognition model to identify one or more previously captured digital images that portray the user from the sample digital image. The digital image identifier 908 can further apply additional models trained to identify selfies (e.g., where the digital image is mostly a person's face), and/or posed pictures (e.g., where the digital image is mostly some portion of a person's body, or the person's body is in the foreground of the image) to the previously captured digital images that portray the user.

In one or more embodiments, the digital image identifier 908 determines whether to capture, or cause a camera 110 of the client device 108 to capture a digital image. For example, in response to receiving a similarity prediction from the machine learning model manager 906, the digital image identifier 908 can determine whether the similarity prediction satisfies a similarity threshold. The digital image identifier 908 can determine whether the similarity predictions satisfies the similarity prediction by determining that the similarity prediction is positive, and/or that the similarity prediction is greater than or equal to a predetermined score. In response to determining that the similarity prediction satisfies the similarity threshold, the digital image identifier 908 can configure instructions for the camera 110 of the client device 108 to automatically capture a digital image from the camera viewfinder stream without any user selection via a user interface or audio input received via the client device 108. Additionally or alternatively, the digital image identifier 908 can capture the digital image from the camera viewfinder stream. For example, the digital image identifier 908 can convert the sample digital image to the captured digital image.

In at least one embodiment, the digital image identifier 908 can cause a camera 110 of the client device 108 to capture a digital video. For example, in response to receiving a similarity prediction from the machine learning model manager 906 that satisfies a similarity threshold, the digital image identifier 908 can cause the camera 110 of the client device 108 to capture a digital video for a threshold amount of time. In one or more embodiments, the digital image identifier 908 can determine the threshold amount of time based on use history, and lengths of previously stored digital videos.

Each of the components 902-908 of the automatic image capturing system 102 can include software, hardware, or both. For example, the components 902-908 can include one or more instructions stored on a computer-readable storage medium and executable by processors of one or more computing devices, such as a client device or server device. When executed by the one or more processors, the computer-executable instructions of the automatic image capturing system 102 can cause the computing device(s) to perform the methods described herein. Alternatively, the components 902-908 can include hardware, such as a special-purpose processing device to perform a certain function or group of functions. Alternatively, the components 902-908 of the automatic image capturing system 102 can include a combination of computer-executable instructions and hardware.

Furthermore, the components 902-908 of the automatic image capturing system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 902-908 may be implemented as a stand-alone application, such as a desktop or mobile application. Furthermore, the components 902-908 may be implemented as one or more web-based applications hosted on a remote server. The components 902-908 may also be implemented in a suite of mobile device applications or "apps." To illustrate, the components 902-908 may be implemented in an application, including but not limited to ADOBE CREATIVE CLOUD, such as ADOBE PHOTOSHOP or ADOBE PHOTOSHOP CAMERA. "ADOBE", "CREATIVE CLOUD", "PHOTOSHOP", and "PHOTOSHOP CAMERA" are either registered trademarks or trademarks of Adobe Systems Incorporated in the United States and/or other countries.

FIGS. 1-9, the corresponding text, and the examples provide a number of different methods, systems, devices, and non-transitory computer-readable media of the automatic image capturing system 102. In addition to the foregoing, one or more embodiments can also be described in terms of flowcharts comprising acts for accomplishing a particular result, as shown in FIGS. 10 and 11. FIGS. 10 and 11 may be performed with more or fewer acts. Further, the acts may be performed in differing orders. Additionally, the acts described herein may be repeated or performed in parallel with one another or parallel with different instances of the same or similar acts.

As mentioned, FIG. 10 illustrates a flowchart of a series of acts 1000 for automatically capturing a digital image of a pose of a user in accordance with one or more embodiments. While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer-readable medium can comprise instructions that, when executed by one or more processors, cause a computing device to perform the acts of FIG. 10. In some embodiments, a system can perform the acts of FIG. 10.

As shown in FIG. 10, the series of acts 1000 includes an act 1010 of identifying a sample digital image portraying a pose of a user. For example, the act 1010 can involve identifying, from a camera viewfinder stream received from a client device, a sample digital image portraying a pose of a user.

As shown in FIG. 10, the series of acts 1000 includes an act 1020 of processing the sample digital image and one or more previously captured digital images portraying one or more poses of the user utilizing a machine learning model to generate one or more similarity predictions. For example, the act 1020 can involve processing the sample digital image and one or more previously captured digital images portraying one or more poses of the user utilizing a machine learning model to generate one or more similarity predictions between the pose of the user from the sample digital image and the one or more poses of the user of the one or more previously captured digital images. For example, processing the sample digital image and the one or more previously captured digital images utilizing the machine learning model can include: generating image pairs comprising combinations of the sample digital image and each of the one or more previously captured digital images, and generate the one or more similarity predictions by utilizing the machine learning model to process the generated image pairs.

Generating the one or more similarity predictions by utilizing the machine learning model to process the generated image pairs can include generating one or more facial expression similarity predictions between a facial expression of the user from the sample digital image and one or more facial expressions of the user from the one or more previously captured digital images. Additionally, identifying the sample digital image portraying the pose of the user can include one or more of identifying the sample digital image portraying a facial expression of the user, or identifying the sample digital image portraying a body position of the user.

In one or more embodiments, the series of acts 1000 includes an act of learning parameters of the machine learning model by utilizing the machine learning model to process a pair-wise learning set comprising positive image pairs, negative image pairs, and ground truths corresponding to the positive image pairs and the negative image pairs. For example, learning parameters of the machine learning model can include: identifying a positive image pair, a negative image pair, and corresponding image pair ground truths from the pair-wise learning set; generating similarity predictions utilizing the machine learning model to process the positive image pair and the negative image pair; and modifying one or more parameters of the machine learning model based on comparing the similarity predictions to the image pair ground truths.

In one or more embodiments, the series of acts 1000 includes an act of generating the pair-wise learning set based on one or more of: a digital image repository or a video clip. For example, generating the pair-wise learning set based on the digital image repository can include: identifying a first digital image in the digital image repository that portrays a person in a first pose; identifying a second digital image in the digital image repository that portrays the person in a second pose; and determining a ground truth for the image pair comprising the first digital image and the second digital image, wherein determining the ground truth is based on a level of similarity between the first pose and the second pose.

Additionally, generating the pair-wise learning set based on the video clip can include: determining a plurality of video clip stages by processing the video clip utilizing one or more segmentation algorithms; sampling a positive image pair from a first video clip stage and a second video clip stage; and sampling a negative image pair from the first video clip stage and a third video clip stage. For example, the series of acts 1000 can include an act of determining the plurality of video clip stages by processing the video clip utilizing one or more of: a frame-by-frame distance scoring algorithm or a frame-to-end-frame distance scoring algorithm.

As shown in FIG. 10, the series of acts 1000 includes an act 1030 of causing a camera of the client device to capture a digital image from the camera viewfinder stream based on the similarity predictions. For example, the act 1030 can involve in response to determining that at least one of the one or more similarity predictions between the pose of the user from the sample digital image and the one or more poses of the user of the one or more previously captured digital images satisfies a similarity threshold, causing a camera of the client device to capture a digital image from the camera viewfinder stream.

As mentioned, FIG. 11 illustrates a flowchart of a series of acts 1100 for automatically capturing a selfie digital image of a facial expression of a user in accordance with one or more embodiments. While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer-readable medium can comprise instructions that, when executed by one or more processors, cause a computing device to perform the acts of FIG. 11. In some embodiments, a system can perform the acts of FIG. 11.

As shown in FIG. 11, the series of acts 1100 includes an act 1110 of identifying a first sample digital image portraying a facial expression of the user. For example, the act 1110 can involve identifying, from a camera viewfinder stream received from a client device, a first sample digital image portraying a facial expression of the user.

As shown in FIG. 11, the series of acts 1100 includes an act 1120 of processing the first sample digital image and the one or more previously captured digital images utilizing the convolutional neural network to generate similarity predictions. For example, the act 1120 can involve processing the first sample digital image and the one or more previously captured digital images utilizing the convolutional neural network to generate similarity predictions.

As shown in FIG. 11, the series of acts 1100 includes an act 1130 of processing the first sample digital image and the one or more previously captured digital images by generating an image pair. For example, the act 1130 can involve processing the first sample digital image and the one or more previously captured digital images utilizing the convolutional neural network to generate similarity predictions by generating an image pair comprising the first sample digital image and a first previously captured digital image portraying a first facial expression of the user.

As shown in FIG. 11, the series of acts 1100 includes an act 1140 of further processing the first sample digital image and the one or more previously captured digital images by processing the image pair utilizing parameters of the convolutional neural network to generate a similarity prediction. For example, the act 1140 can involve further processing the first sample digital image and the one or more previously captured digital images utilizing the convolutional neural network to generate similarity predictions by processing the image pair utilizing the parameters of the convolutional neural network to generate a similarity prediction between the facial expression of the first sample digital image and the first facial expression of the first previously captured digital image.

As shown in FIG. 11, the series of acts 1100 includes an act 1150 of capturing a digital image based on the similarity prediction. For example, the act 1150 can involve capturing a digital image from the camera viewfinder stream based on the similarity prediction. In one or more embodiments, capturing the digital image based on the similarity prediction includes determining that the similarity prediction satisfies a similarity threshold.

In one or more embodiments, the series of acts 1100 further includes acts of identifying a second sample digital image portraying a facial expression of the user from the camera viewfinder stream received from the client device, and processing the second sample digital image and the one or more previously captured digital images utilizing the convolutional neural network to generate additional similarity predictions. The series of acts 1100 can further include an act of, in response to determining that the additional similarity predictions are negative similarity predictions, identifying a third sample digital image portraying a facial expression of the user from the camera viewfinder stream.

In one or more embodiments, the series of acts 1100 further includes an act of learning parameters of the convolutional neural network. For example, learning parameters of the convolutional neural network can include: applying the convolutional neural network to positive facial expression image pairs and negative facial expression image pairs to generate a plurality of similarity predictions; and modifying parameters of the convolutional neural network by comparing the plurality of similarity predictions to ground truths associated with the positive facial expression image pairs and the negative facial expression image pairs.

In at least one embodiment, the series of acts 1100 includes an act of generating a pair-wise learning set associated with convolutional neural network. For example, generating the pair-wise learning set associated with convolutional neural network can include identifying a first image in an digital mage repository that portray a person with a first facial expression; identifying a second image in the digital image repository that portrays the person with a second facial expression; and determining a ground truth for the image pair comprising the first image and the second image, wherein determining the ground truth is based on a level of similarity between the first facial expression and the second facial expression. In another example, generating the pair-wise learning set associated with convolutional neural network can include determining a plurality of video clip stages by processing a video clip utilizing one or more decomposition algorithms; sampling a positive image pair from a first video clip stage and a second video clip stage; and sampling a negative image pair from the first video clip stage and a third video clip stage.

In the alternative to the acts described above, in some embodiments, the automatic image capturing system 102 performs a step for automatically capturing a digital image portraying a pose of the user that corresponds to the one or more poses of the user. In particular, the algorithm and acts described above in relation to FIGS. 2-4B can comprise the acts (or structure) corresponding to a step for automatically capturing a digital image portraying a pose of the user that corresponds to the one or more poses of the user.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 12:
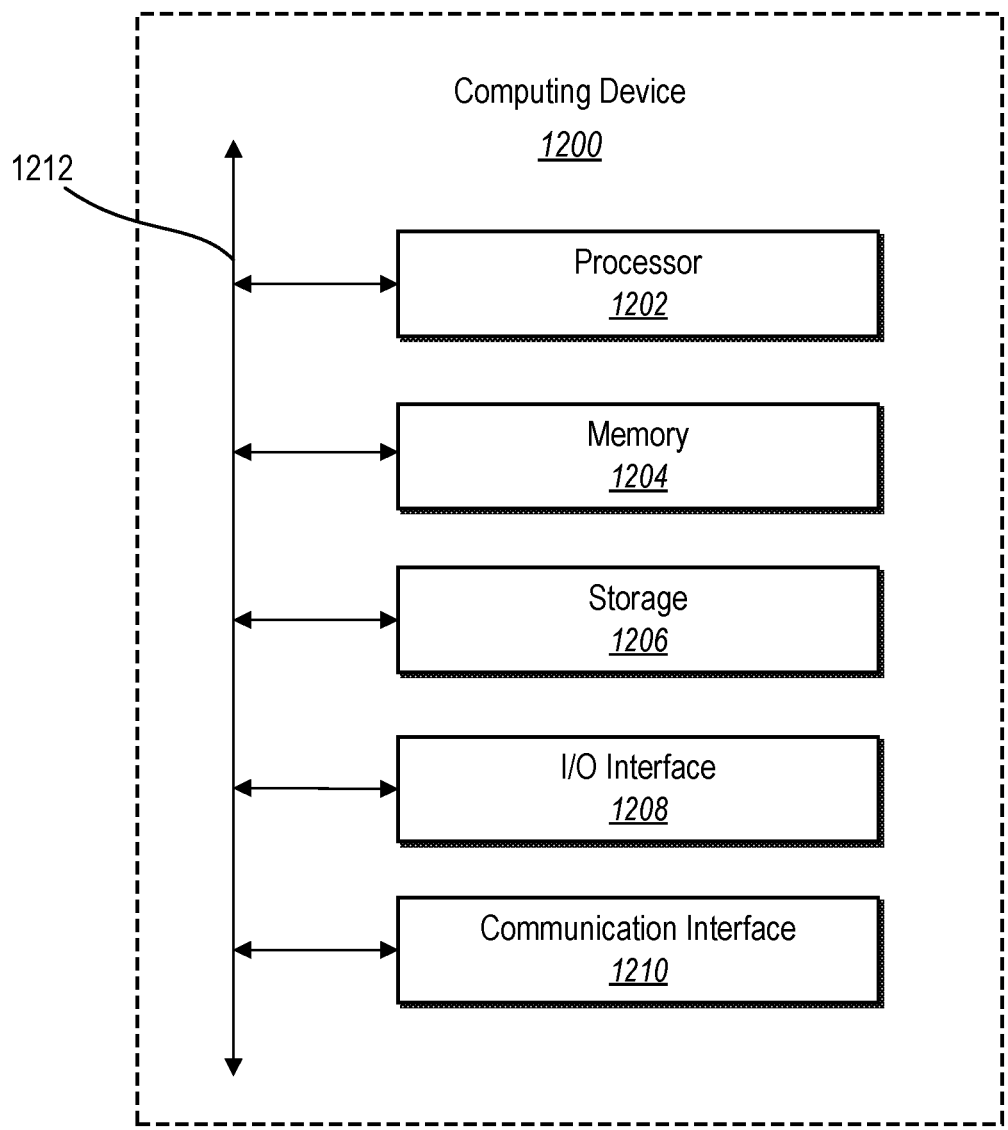
FIG. 12 illustrates a block diagram of an example computing device for implementing one or more embodiments of the present disclosure.

FIG. 12 illustrates a block diagram of an example computing device 1200 that may be configured to perform one or more of the processes described above. One will appreciate that one or more computing devices, such as the computing device 1200 may represent the computing devices described above (e.g., the server(s) 106, the client device 108). In one or more embodiments, the computing device 1200 may be a mobile device (e.g., a mobile telephone, a smartphone, a PDA, a tablet, a laptop, a camera, a tracker, a watch, a wearable device, etc.). In some embodiments, the computing device 1200 may be a non-mobile device (e.g., a desktop computer or another type of client device). Further, the computing device 1200 may be a server device that includes cloud-based processing and storage capabilities.

As shown in FIG. 12, the computing device 1200 can include one or more processor(s) 1202, memory 1204, a storage device 1206, input/output interfaces 1208 (or "I/O interfaces 1208"), and a communication interface 1210, which may be communicatively coupled by way of a communication infrastructure (e.g., bus 1212). While the computing device 1200 is shown in FIG. 12, the components illustrated in FIG. 12 are not intended to be limiting. Additional or alternative components may be used in other embodiments. Furthermore, in certain embodiments, the computing device 1200 includes fewer components than those shown in FIG. 12. Components of the computing device 1200 shown in FIG. 12 will now be described in additional detail.

In particular embodiments, the processor(s) 1202 includes hardware for executing instructions, such as those making up a computer program. As an example, and not by way of limitation, to execute instructions, the processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, the storage device 1206 can include a non-transitory storage medium described above. The storage device 1206 may include a hard disk drive (HDD), flash memory, a Universal Serial Bus (USB) drive or a combination these or other storage devices.

As shown, the computing device 1200 includes one or more I/O interfaces 1208, which are provided to allow a user to provide input to (such as user strokes), receive output from, and otherwise transfer data to and from the computing device 1200. These I/O interfaces 1208 may include a mouse, keypad or a keyboard, a touch screen, camera, optical scanner, network interface, modem, other known I/O devices or a combination of such I/O interfaces 1208. The touch screen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1208 are configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can include hardware, software, or both that connects components of computing device 1200 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable storage medium comprising instructions that, when executed by at least one processor, cause the at least one processor to perform operations comprising:
   identifying, from a camera viewfinder stream received from a client device, a first sample digital image portraying a facial expression of a user;
   identifying, utilizing a facial recognition model, the user within the first sample digital image;
   in response to identifying the user within the first sample digital image, utilizing the facial recognition model to identify one or more previously captured digital images portraying the user;

generating facial expression similarity predictions between a facial expression of the user in the first sample digital image and a first facial expression of the user in the one or more previously captured digital images portraying the user utilizing a neural network by:
generating an image pair comprising the first sample digital image and the one or more previously captured digital images portraying the user having the first facial expression of the user; and
generating a similarity prediction between the facial expression of the user from the first sample digital image and the first facial expression of the user from the one or more previously captured digital images utilizing parameters of the neural network; and
capturing a digital image from the camera viewfinder stream from the client device based on the similarity prediction.

2. The non-transitory computer-readable storage medium as recited in claim 1, wherein the operations further comprise:
identifying a second sample digital image portraying a facial expression of the user from the camera viewfinder stream from the client device;
generating additional facial expression similarity predictions between the second sample digital image and the one or more previously captured digital images utilizing the neural network; and
in response to determining that the additional facial expression similarity predictions are negative facial expression similarity predictions, identifying a third sample digital image portraying a facial expression of the user from the camera viewfinder stream.

3. The non-transitory computer-readable storage medium as recited in claim 1, wherein capturing the digital image based on the similarity prediction is in response to determining that the similarity prediction satisfies a similarity threshold.

4. The non-transitory computer-readable storage medium as recited in claim 3, wherein capturing the digital image based on the similarity prediction is performed automatically without user input.

5. The non-transitory computer-readable storage medium as recited in claim 1, wherein generating the similarity prediction between the facial expression of the user from the first sample digital image and the first facial expression of the user from the one or more previously captured digital images comprises determining subtle similarities and differences between the facial expression of the user from the first sample digital image and the first facial expression of the user from the one or more previously captured digital images.

6. The non-transitory computer-readable storage medium as recited in claim 5, wherein generating the similarity prediction between the facial expression of the user from the first sample digital image and the first facial expression of the user from the one or more previously captured digital images comprises:
generating a first encoding of the first sample digital image in a feature vector space utilizing the parameters of the neural network;
generating a second encoding of the one or more previously captured digital images in the feature vector space utilizing the parameters of the neural network; and
determining a distance between the first encoding and the second encoding in the feature vector space.

7. A system comprising:
one or more memory devices storing a neural network; and
one or more processors coupled to the one or more memory devices, the one or more processors configured to cause the system to:
identify, from a camera viewfinder stream received from a client device, a first sample digital image portraying a facial expression of a user;
identify, utilizing a facial recognition model, the user within the first sample digital image;
in response to identifying the user within the first sample digital image, utilize the facial recognition model to identify one or more previously captured digital images portraying the user;
generate facial expression similarity predictions between a facial expression of the user in the first sample digital image and a first facial expression of the user in the one or more previously captured digital images portraying the user utilizing the neural network by:
generating an image pair comprising the first sample digital image and the one or more previously captured digital images portraying the user having the first facial expression of the user; and
generating a similarity prediction between the facial expression of the user from the first sample digital image and the first facial expression of the user from the one or more previously captured digital images utilizing parameters of the neural network; and
capture a digital image from the camera viewfinder stream from the client device based on the similarity prediction.

8. The system as recited in claim 7, wherein the one or more processors are further configured to cause the system to capture the digital image based on the similarity prediction in response to determining that the similarity prediction satisfies a similarity threshold.

9. The system as recited in claim 8, wherein the one or more processors are further configured to cause the system to capture the digital image based on the similarity prediction automatically without user input.

10. The system as recited in claim 7, wherein the one or more processors are further configured to cause the system to generate the similarity prediction between the facial expression of the user from the first sample digital image and the first facial expression of the user from the one or more previously captured digital images by determining subtle similarities and differences between the facial expression of the user from the first sample digital image and the first facial expression of the user from the one or more previously captured digital images.

11. The system as recited in claim 10, wherein the one or more processors are further configured to cause the system to generate the similarity prediction between the facial expression of the user from the first sample digital image and the first facial expression of the user from the one or more previously captured digital images by:
generating a first encoding of the first sample digital image in a feature vector space utilizing the parameters of the neural network;
generating a second encoding of the one or more previously captured digital images in the feature vector space utilizing the parameters of the neural network; and
determining a distance between the first encoding and the second encoding in the feature vector space.

12. A method comprising:
- identifying, from a camera viewfinder stream received from a client device, a first sample digital image portraying a facial expression of a user;
- identifying, utilizing a facial recognition model, the user within the first sample digital image;
- in response to identifying the user within the first sample digital image, utilizing the facial recognition model to identify one or more previously captured digital images portraying the user;
- generating facial expression similarity predictions between a facial expression of the user in the first sample digital image and a first facial expression of the user in the one or more previously captured digital images portraying the user utilizing a neural network by:
  - generating an image pair comprising the first sample digital image and the one or more previously captured digital images portraying the user having the first facial expression of the user; and
  - generating a similarity prediction between the facial expression of the user from the first sample digital image and the first facial expression of the user from the one or more previously captured digital images utilizing parameters of the neural network; and
- capturing a digital image from the camera viewfinder stream from the client device based on the similarity prediction.

13. The method as recited in claim 12, further comprising:
- identifying a second sample digital image portraying a facial expression of the user from the camera viewfinder stream from the client device;
- generating additional facial expression similarity predictions between the second sample digital image and the one or more previously captured digital images utilizing the neural network; and
- in response to determining that the additional facial expression similarity predictions are negative facial expression similarity predictions, identifying a third sample digital image portraying a facial expression of the user from the camera viewfinder stream.

14. The method as recited in claim 12, wherein capturing the digital image based on the similarity prediction is in response to determining that the similarity prediction satisfies a similarity threshold.

15. The method as recited in claim 12, wherein capturing the digital image based on the similarity prediction is performed automatically without user input.

16. The method as recited in claim 12, wherein generating the similarity prediction between the facial expression of the user from the first sample digital image and the first facial expression of the user from the one or more previously captured digital images comprises determining subtle similarities and differences between the facial expression of the user from the first sample digital image and the first facial expression of the user from the one or more previously captured digital images.

17. The method as recited in claim 12, wherein generating the similarity prediction between the facial expression of the user from the first sample digital image and the first facial expression of the user from the one or more previously captured digital images comprises:
- generating a first encoding of the first sample digital image in a feature vector space utilizing the parameters of the neural network;
- generating a second encoding of the one or more previously captured digital images in the feature vector space utilizing the parameters of the neural network; and
- determining a distance between the first encoding and the second encoding in the feature vector space.

18. The method as recited in claim 12, further comprising determining that the user is ready for automatic image capturing before identifying, from the camera viewfinder stream received from the first sample digital image, the first sample digital image portraying the facial expression of the user.

19. The method as recited in claim 18, wherein determining that the user is ready for automatic image capturing comprises applying one or more models to frames from the camera viewfinder stream to identify the first sample digital image.

20. The method as recited in claim 18, wherein determining that the user is ready for automatic image capturing comprises applying a body detection model to frames of the camera viewfinder stream at regular intervals until the body detection model indicates that a particular frame includes more than a predetermined percentage of a human body.

* * * * *